US012379679B2

(12) United States Patent
Suetsugu et al.

(10) Patent No.: US 12,379,679 B2
(45) Date of Patent: Aug. 5, 2025

(54) IMAGE FORMING APPARATUS

(71) Applicant: CANON KABUSHIKI KAISHA, Tokyo (JP)

(72) Inventors: Masahiro Suetsugu, Kanagawa (JP); Shinichi Nishida, Kanagawa (JP); Tetsushi Uneme, Kanagawa (JP); Tsuyoshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/424,489

(22) Filed: Jan. 26, 2024

(65) Prior Publication Data

US 2024/0231258 A1 Jul. 11, 2024

Related U.S. Application Data

(63) Continuation of application No. PCT/JP2022/028514, filed on Jul. 22, 2022.

(30) Foreign Application Priority Data

Jul. 29, 2021 (JP) ................................ 2021-124190

(51) Int. Cl.
*G03G 15/08* (2006.01)
*G03G 15/00* (2006.01)

(52) U.S. Cl.
CPC ..... *G03G 15/0886* (2013.01); *G03G 15/0874* (2013.01); *G03G 15/0889* (2013.01); *G03G 15/5016* (2013.01); *G03G 15/556* (2013.01)

(58) Field of Classification Search
CPC .......... G03G 15/0874; G03G 15/0886; G03G 15/0889; G03G 15/5016; G03G 15/556
See application file for complete search history.

(56) References Cited

U.S. PATENT DOCUMENTS 6,332,065 B1 * 12/2001 Howard ............ G03G 15/0867 222/DIG. 1
10,241,440 B1 * 3/2019 Sato .................. G03G 15/0889
2021/0103235 A1 4/2021 Oshima
(Continued)

FOREIGN PATENT DOCUMENTS

JP 2000227704 A 8/2000
JP 2001255727 A 9/2001
JP 2004117387 A 4/2004
(Continued)

*Primary Examiner* — Hoang X Ngo

(74) *Attorney, Agent, or Firm* — Canon U.S.A., Inc. IP Division

(57) ABSTRACT

An image forming apparatus including an attachment portion, a storage portion, and an agitation member, an actuator, and a control unit, wherein the attachment portion includes an operation portion, including an engagement portion engaging with the shutter, configured to move with the shutter by the engagement portion being engaged with the shutter, the operation portion being movable between a first position where the shutter is at a closed position and a second position where the shutter is at an opened position, and a detection unit detecting a movement of the operation portion, and wherein the control unit controls the actuator so that driving of the agitation member is started based on the detection of a movement of the operation portion from the second position to the first position.

17 Claims, 26 Drawing Sheets

(56) References Cited

U.S. PATENT DOCUMENTS

2022/0082960 A1 * 3/2022 Munetsugu ........ G03G 15/0886

FOREIGN PATENT DOCUMENTS

| | | | |
|---|---|---|---|
| JP | 2008058339 | A | 3/2008 |
| JP | 2020086450 | A | 6/2020 |
| JP | 2020154300 | A | 9/2020 |
| JP | 2021026201 | A | 2/2021 |
| JP | 2021060462 | A | 4/2021 |

* cited by examiner

NEARLY OUT

LOW

MID

FULL

IMAGE FORMING APPARATUS

CROSS-REFERENCE TO RELATED APPLICATIONS

This application is a Continuation of International Patent Application No. PCT/JP2022/028514, filed Jul. 22, 2022, which claims the benefit of Japanese Patent Application No. 2021-124190, filed Jul. 29, 2021, both of which are hereby incorporated by reference herein in their entirety.

BACKGROUND OF THE INVENTION

Field of the Invention

The present invention relates to an image forming apparatus that forms an image on a recording material.

Background Art

Generally, an electrophotographic image forming apparatus ultimately transfers a toner image formed on a surface of a photosensitive drum to a recording material, to form an image on the recording material. A configuration in which the image forming apparatus is replenished with toner from outside the image forming apparatus is widely employed. Patent literature (PTL) 1 discusses an image forming apparatus in which a toner container storing toner is attached to an attachment portion of the image forming apparatus, and a user softens the toner container to replenish the image forming apparatus with toner from the toner container.

CITATION LIST

Patent Literature

PTL 1: Japanese Patent Laid-Open No. 2020-154300

SUMMARY OF THE INVENTION

The present invention is directed to further improving usability related to toner replenishment in the image forming apparatus in patent literature.

An image forming apparatus to which a toner container is attachable, the toner container storing toner and including an opening portion for toner replenishment and a shutter movable between a closed position where the opening portion is closed and an opened position where the opening portion is opened, the image forming apparatus includes an attachment portion configured to receive attachment of the toner container, a storage portion configured to store toner supplied from the opening portion of the toner container attached to the attachment portion, an agitation member configured to agitate toner in the storage portion, an actuator configured to drive the agitation member; and, a control unit configured to control the actuator, wherein the attachment portion includes an operation portion, including an engagement portion configured to be engaged with the shutter in a state where the toner container is attached to the attachment portion, configured to move with the shutter by the engagement portion being engaged with the shutter, the operation portion being movable between a first position where the shutter is at the closed position and a second position where the shutter is at the opened position, and a detection unit configured to detect a movement of the operation portion, and wherein the control unit controls the actuator in such a manner that driving of the agitation member is started based on detection by the detection unit detecting a movement of the operation portion from the second position to the first position.

Further features of the present invention will become apparent from the following description of exemplary embodiments with reference to the attached drawings.

DESCRIPTION OF THE EMBODIMENTS

Exemplary embodiments for carrying out the present invention will be described below with reference to the drawings.

First Exemplary Embodiment

Figure 1:
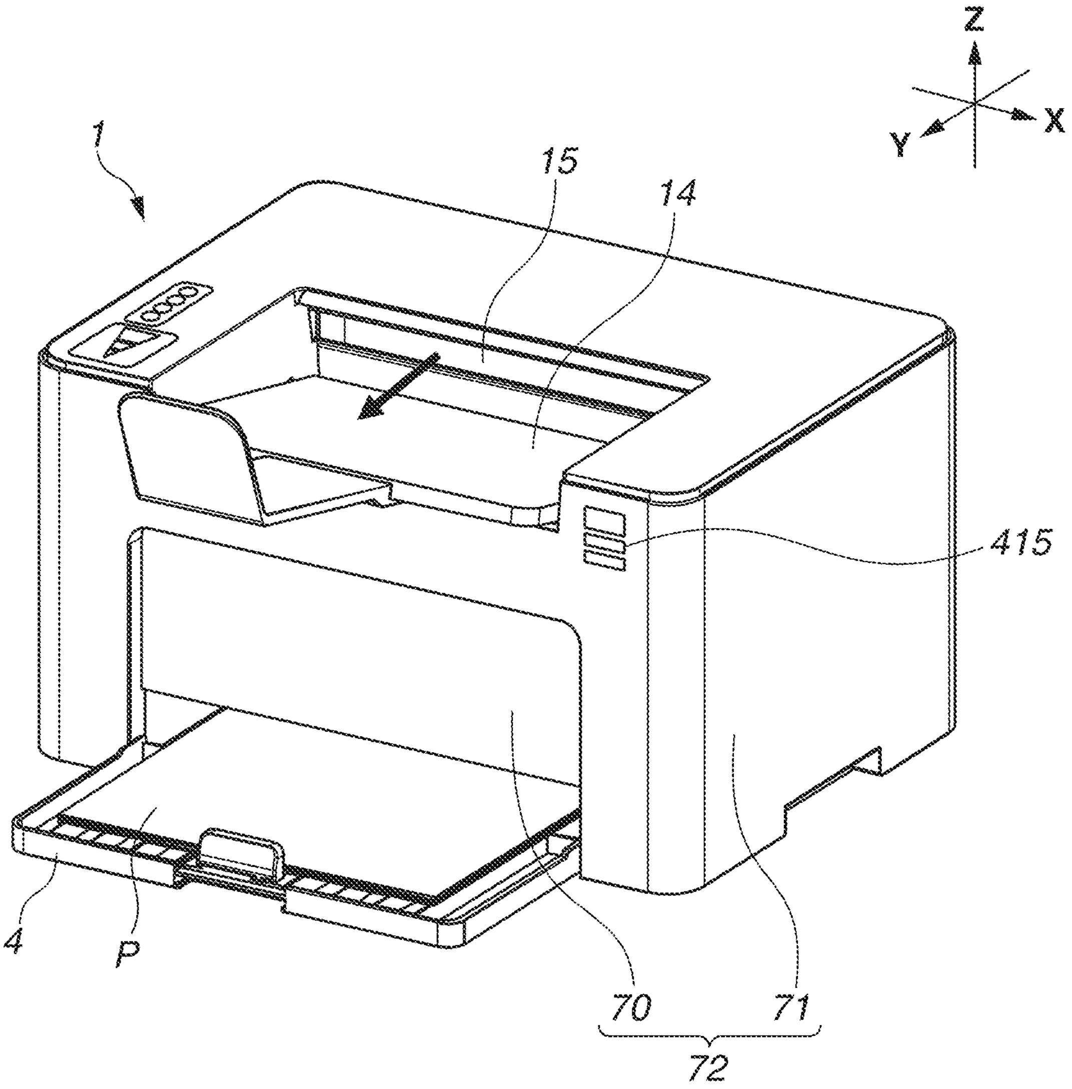
FIG. 1 is a perspective view illustrating an image forming apparatus according to a first exemplary embodiment.
Figure 2:
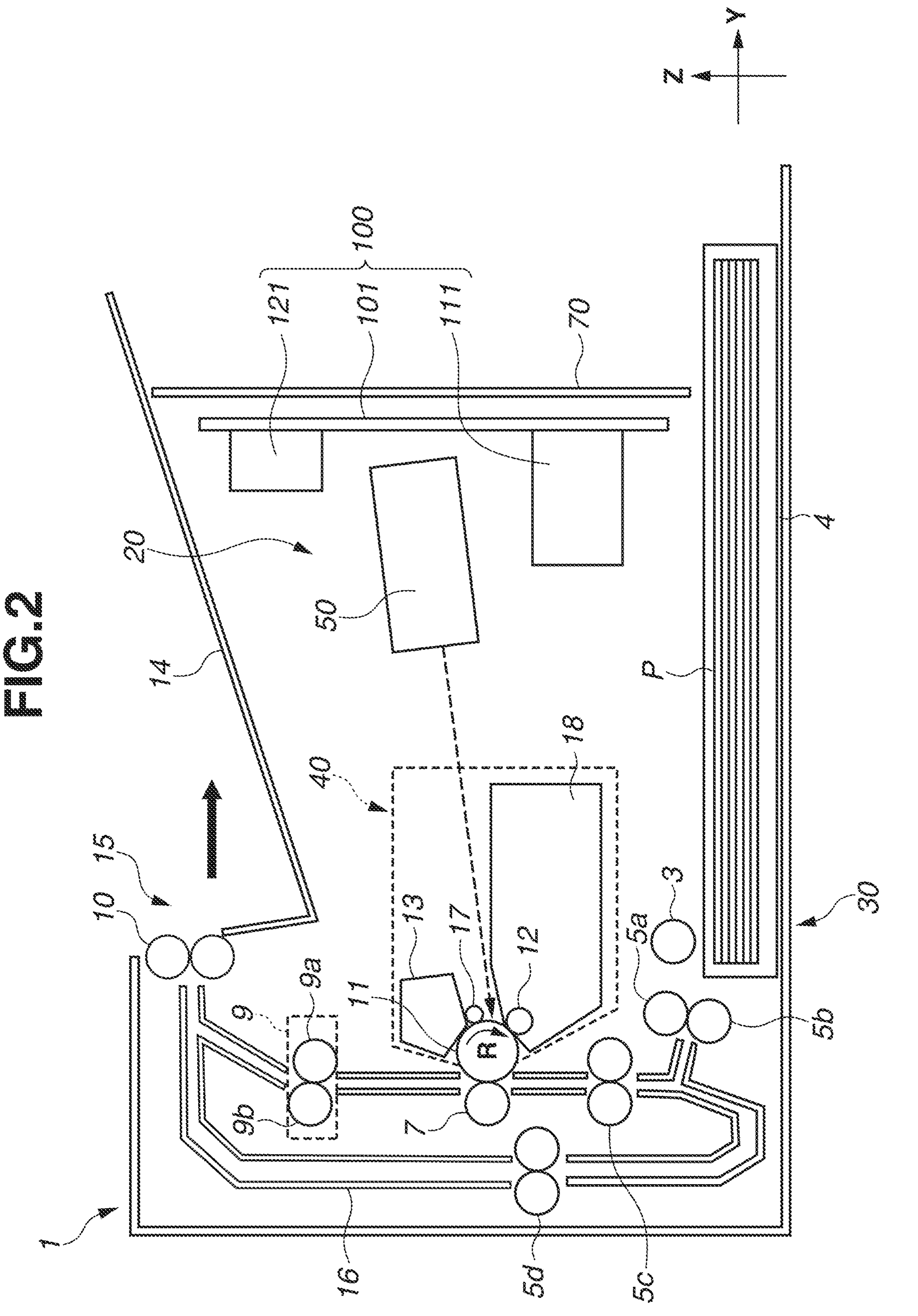
FIG. 2 is a schematic cross-sectional view of the image forming apparatus according to the first exemplary embodiment.

FIG. 1 is a perspective view of an image forming apparatus 1 according to a first exemplary embodiment. FIG. 2 is a schematic cross-sectional view of the image forming apparatus 1. The image forming apparatus 1 is a monochrome printer that forms an image on a recording material, based on image information input from an external device. Examples of the recording material include various sheet materials made of different materials, e.g., paper such as plain paper and thick paper, a plastic film such as an overhead projector sheet, sheets having special shapes such as an envelope and index paper, and cloth.

In the following description, the height direction of the image forming apparatus 1 (a direction opposite to the vertical direction) in a case where the image forming apparatus 1 is installed on a horizontal surface is a Z-direction. A direction intersecting the Z-direction and parallel to a rotational axis direction (a main scanning direction) of a photosensitive drum 11 is an X-direction. A direction intersecting the X-direction and the Z-direction is a Y-direction. It is desirable that the X-direction, the Y-direction, and the Z-direction should perpendicularly intersect each other. For convenience, the positive side in the X-direction is referred to as a right side, and the negative side in the X-direction is referred to as a left side. The positive side in the Y-direction is referred to as a front side or a front surface side, and the negative side in the Y-direction is referred to as a back side or a back surface side. The positive side in the Z-direction is referred to as an upper side, and the negative side in the Z-direction is referred to as a lower side.

Overall Configuration

With reference to FIGS. 1 and 2, the overall configuration of the image forming apparatus 1 is described. As illustrated in FIG. 2, the image forming apparatus 1 includes an image forming unit 20 that forms a toner image on the recording material, a feeding unit 30 that feeds the recording material P, a fixing unit 9 that fixes the toner image formed by the image forming unit 20 to the recording material, and a discharge roller pair 10.

The image forming unit 20 includes a scanner unit 50, an electrophotographic process unit 40, and a transfer roller 7 that transfers a toner image formed on a photosensitive drum 11 of the process unit 40 to the recording material P. The process unit 40 includes the photosensitive drum 11 and a cleaning unit 13, a charging roller 17, a development roller 12, and a containing unit 18 that contains toner, which are placed around the photosensitive drum 11. The process unit 40 may be screwed to a housing 72 of the image forming apparatus 1. A process unit that is removed by a serviceman is also included in the process unit 40.

The photosensitive drum 11 as an image bearing member is a photosensitive member molded into a cylindrical shape. The photosensitive drum 11 according to the present exemplary embodiment includes a photosensitive layer formed of a negatively charged organic photosensitive member on a drum-like base molded from aluminum. The photosensitive drum 11 as the image bearing member is rotationally driven at a predetermined process speed in a predetermined direction (a direction R in FIG. 2) by a motor.

The charging roller 17 comes into contact with the photosensitive drum 11 with a predetermined pressure contact force and forms a charging portion. An application of a desired charging voltage to the charging roller 17 by a charging high-voltage power supply uniformly charges the surface of the photosensitive drum 11 to a predetermined potential. In the present exemplary embodiment, the photosensitive drum 11 is charged to a negative polarity by the charging roller 17.

The scanner unit 50 emits laser light corresponding to image information, which has been input from the external device to the photosensitive drum 11, by using a polygon mirror to scan and expose the surface of the photosensitive drum 11. As a result of the exposure, an electrostatic latent image according to the image information is formed on the surface of the photosensitive drum 11. The scanner unit 50 is not limited to a laser scanner device, and for example, a light-emitting diode (LED) exposure device including an LED array in which a plurality of LEDs is arranged in the longitudinal direction of the photosensitive drum 11 may be employed.

The development roller 12 is rotatably supported by the containing unit 18. The development roller 12 is disposed in an opening portion of a development container 230 (see FIG. 4) including the containing unit 18 in such a manner that the development roller 12 faces the photosensitive drum 11. In the containing unit 18, a supply roller for applying toner serving as a developer stored in the containing unit 18 to the surface of the development roller 12 may be disposed.

The process unit 40 according to the present exemplary embodiment uses a contact development method as a development method. That is, a toner layer borne on the development roller 12 comes into contact with the photosensitive drum 11 in a development portion (a development area) where the photosensitive drum 11 and the development roller 12 face each other. A development voltage is applied to the development roller 12 by a development high-voltage power supply. Because of the development voltage, the toner borne on the development roller 12 is transferred from the development roller 12 to the surface of the photosensitive drum 11 according to the potential distribution of the drum surface, whereby the electrostatic latent image is developed into a toner image.

The toner according to the present exemplary embodiment is a nonmagnetic one-component developer, which is toner that does not contain a magnetic component and is borne on the development roller 12 mainly by an intermolecular force or an electrostatic force (an image force). Alternatively, a one-component developer containing a magnetic component may be used. Some types of the one-component developer include an additive (e.g., wax or silica microparticles) for adjusting the fluidity or the charging performance of toner in addition to toner particles. Alternatively, a two-component developer composed of nonmagnetic toner and a magnetic carrier may be used as a developer. In a case where a magnetic developer is used, for example, a cylindrical development sleeve inside which a magnet is placed is used as a developer bearing member.

The fixing unit 9 uses a heat fixing method in which the process of fixing an image is performed by heating and fusing the toner on the recording material. The fixing unit 9 includes a heating roller 9*a* including a fixing heater, and a pressure roller 9*b* that is in pressure contact with the heating roller 9*a*.

The feeding unit 30 includes a cassette 4 in which the recording material P is stacked, and a pickup roller 3, a feeding roller 5*a*, and a separation roller 5*b*, which serve as a conveyance unit. In a part of the end surface on the front surface of the image forming apparatus 1, a front cover 70 is disposed. The front cover 70 covers a circuit substrate 100. The housing 72 includes the front cover 70, a discharge tray 14, and an exterior cover 71 forming the exterior of the image forming apparatus 1 except for the front cover 70 and the discharge tray 14. In the housing 72, a discharge opening 15 through which the sheet to be discharged to the discharge tray 14 passes is formed.

As illustrated in FIG. 2, the image forming apparatus 1 includes the circuit substrate 100. The circuit substrate 100 includes a wiring board 101 made of an insulator and electronic components 111 and 121 soldered to the wiring board 101. Conductor wiring is disposed on and inside the board of the wiring board 101, and therefore, the electronic components 111 and 121 are electrically connected together. The circuit substrate 100 has the functions of converting an alternating current supplied from outside the image forming apparatus 1 into a direct current and converting an input voltage to obtain a predetermined voltage value required for an image forming process.

The circuit substrate 100 is disposed in such a direction that the surface of the wiring board 101 on which the electronic components 111 and 121 are mounted intersects a discharge direction. Further, the wiring board 101 is disposed between the front cover 70 and the scanner unit 50 in the discharge direction. The electronic components 111 and 121 are disposed on the surface of the wiring board 101 on the side facing the scanner unit 50.

[Image Forming Mode]

Figure 3A:
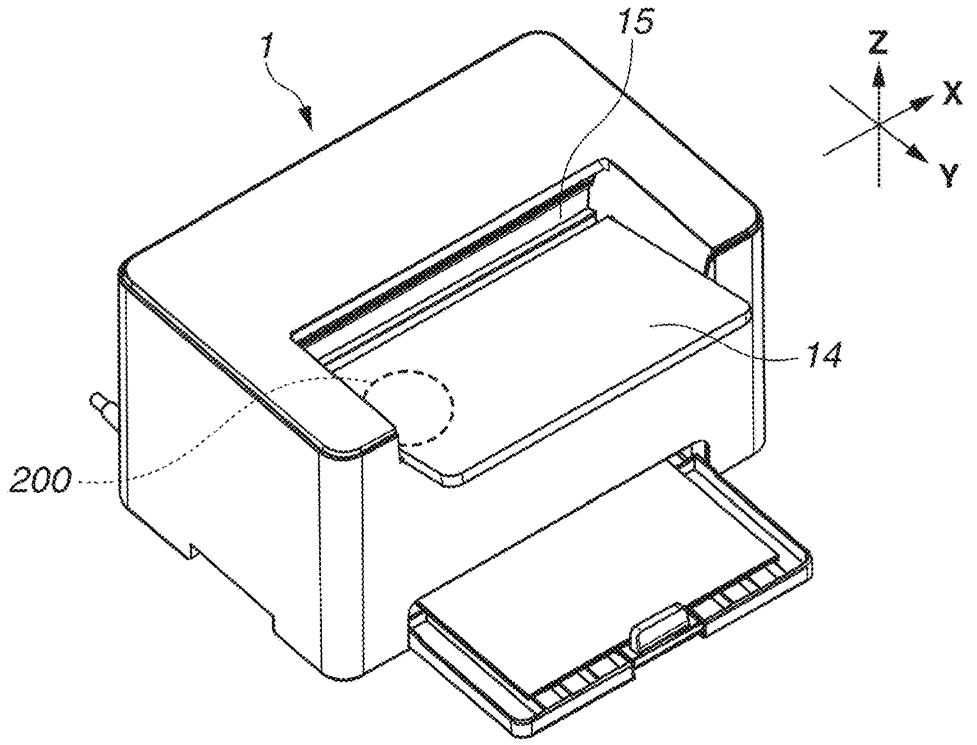
FIG. 3A is a perspective view illustrating a state where a discharge tray of the image forming apparatus according to the first exemplary embodiment is at a closed position and an opened position.

Next, an image forming mode of the image forming apparatus 1 is described. In an image forming mode according to the present exemplary embodiment, an image is formed on the recording material in the state where the discharge tray 14 is at a closed position as illustrated in FIGS. 1 and 3A. In response to an image forming command being input to the image forming apparatus 1, the image forming unit 20 starts an image forming process based on image information input from an external computer connected to the image forming apparatus 1. The scanner unit 50 emits laser light to the photosensitive drum 11, based on the input image information. In this process, the photosensitive drum 11 has been charged by the charging roller 17, and the irradiation of the laser light forms an electrostatic latent image on the photosensitive drum 11. The development roller 12 develops the electrostatic latent image, and a toner image is formed on the photosensitive drum 11.

Simultaneously with the above-described image forming process, the pickup roller 3 of the feeding unit 30 feeds the recording material P supported by the cassette 4. Recording materials P are separated one by one by the feeding roller 5*a* and the separation roller 5*b*, and each recording material P is conveyed to a conveyance roller pair 5*c*. Then, the conveyance roller pair 5*c* conveys the recording material P to a transfer nip formed between the transfer roller 7 and the photosensitive drum 11.

A transfer voltage is applied to the transfer roller 7 by a transfer high-voltage power supply, and the toner image borne on the photosensitive drum 11 is transferred to the recording material P conveyed by the conveyance roller pair 5*c*. The recording material P to which the toner image has been transferred is conveyed to the fixing unit 9. When the recording material P passes through a nip portion between the heating roller 9*a* and the pressure roller 9*b* of the fixing unit 9, the toner image is heated and pressurized. This fuses toner particles, and the toner particles firmly adhere, whereby the toner image is fixed to the recording material P. The recording material P passed through the fixing unit 9 is discharged through the discharge opening 15 to outside the image forming apparatus 1 (outside the apparatus) by the discharge roller pair 10 and stacked on the discharge tray 14.

In a case where images are formed on both sides of the recording material P, the discharge roller pair 10 conveys the recording material P, on a first surface of which an image has been formed, in a backward direction to guide the recording material P to a two-sided conveyance path 16. The recording material P guided to the two-sided conveyance path 16 is conveyed toward the transfer roller 7 again by a two-sided conveyance roller pair 5*d*. After an image is formed on a second surface of the recording material P by the transfer roller 7, the recording material P is discharged to outside the apparatus by the discharge roller pair 10. After the transfer of the toner image to the recording material P, toner remaining on the photosensitive drum 11 is cleaned by the cleaning unit 13.

[Replenishment Portion]

Figure 3B:
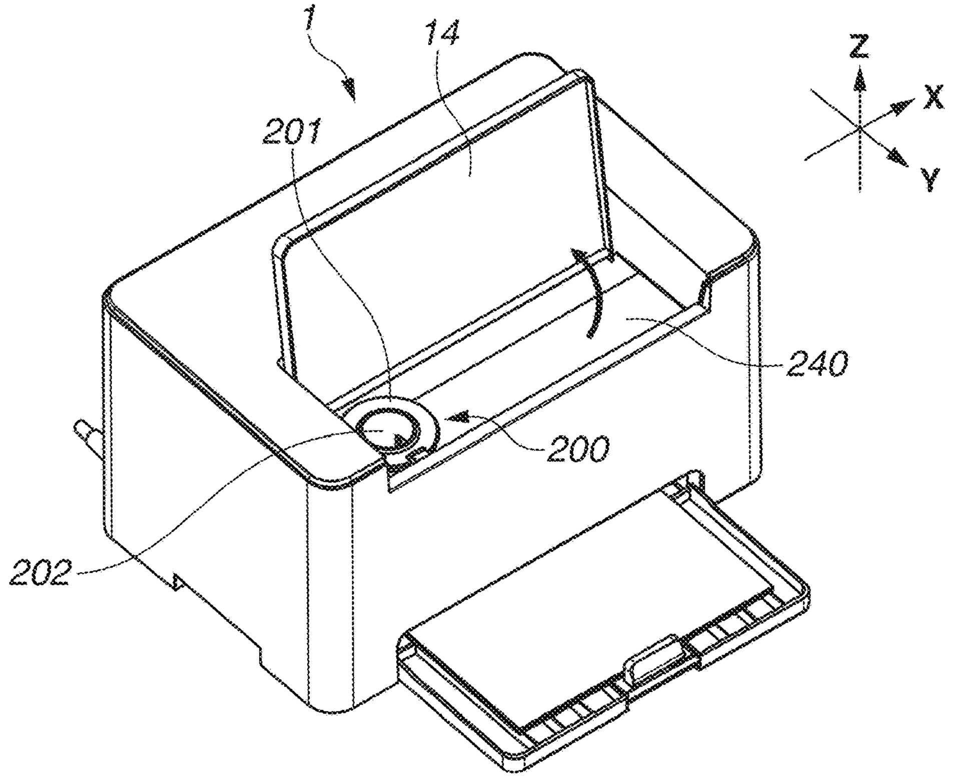
FIG. 3B is a perspective view illustrating the state where the discharge tray of the image forming apparatus according to the first exemplary embodiment is at the closed position and the opened position.

Next, with reference to FIGS. 3A and 3B to FIGS. 7A, 7B, and 7C, a replenishment portion 200 (an attachment portion)

is described. The discharge tray 14 is openably and closably supported to be movable between a closed position where the recording material P can be stacked and the image forming mode can be executed as illustrated in FIG. 3A, and an opened position where the discharge tray 14 is opened as illustrated in FIG. 3B. An opening/closing detection unit (not illustrated) can detect at which of the opened position and the closed position the sheet discharge tray 14 is. The discharge tray 14 covers the replenishment portion 200 at the closed position. When the discharge tray 14 is moved to the opened position, a top surface portion 240 and the replenishment portion 200 disposed adjacent to the top surface portion 240 are exposed. The replenishment portion 200 is configured such that a replenishment pack 210 is attachable to and detachable from the replenishment portion 200. The replenishment portion 200 is configured such that a user or a serviceman can replenish the image forming apparatus 1 with toner from outside without removing the development container 230 from the housing 72 (FIG. 1).

Figure 4:
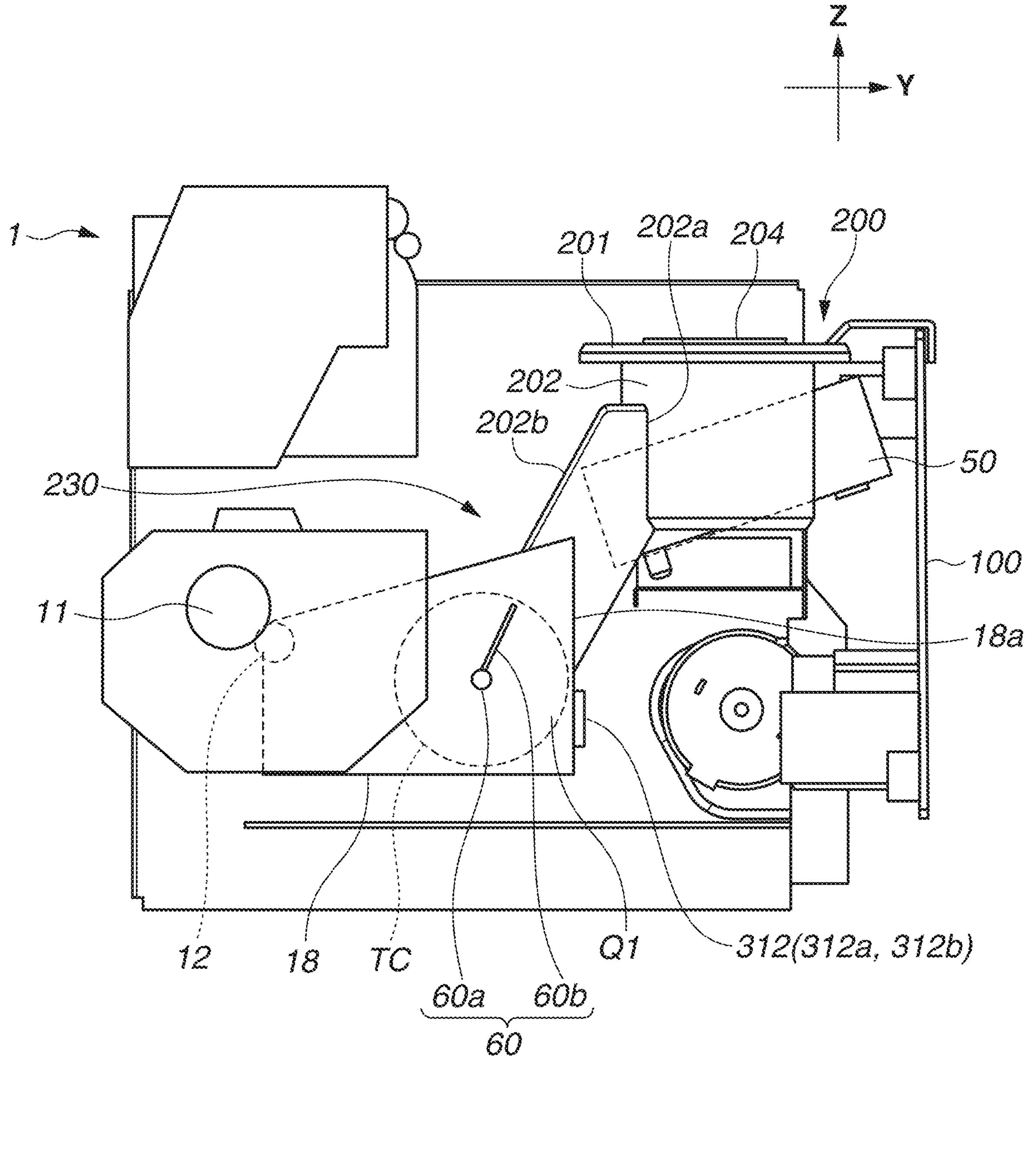
FIG. 4 is a cross-sectional view of a development container of the image forming apparatus according to the first exemplary embodiment.
Figure 5:
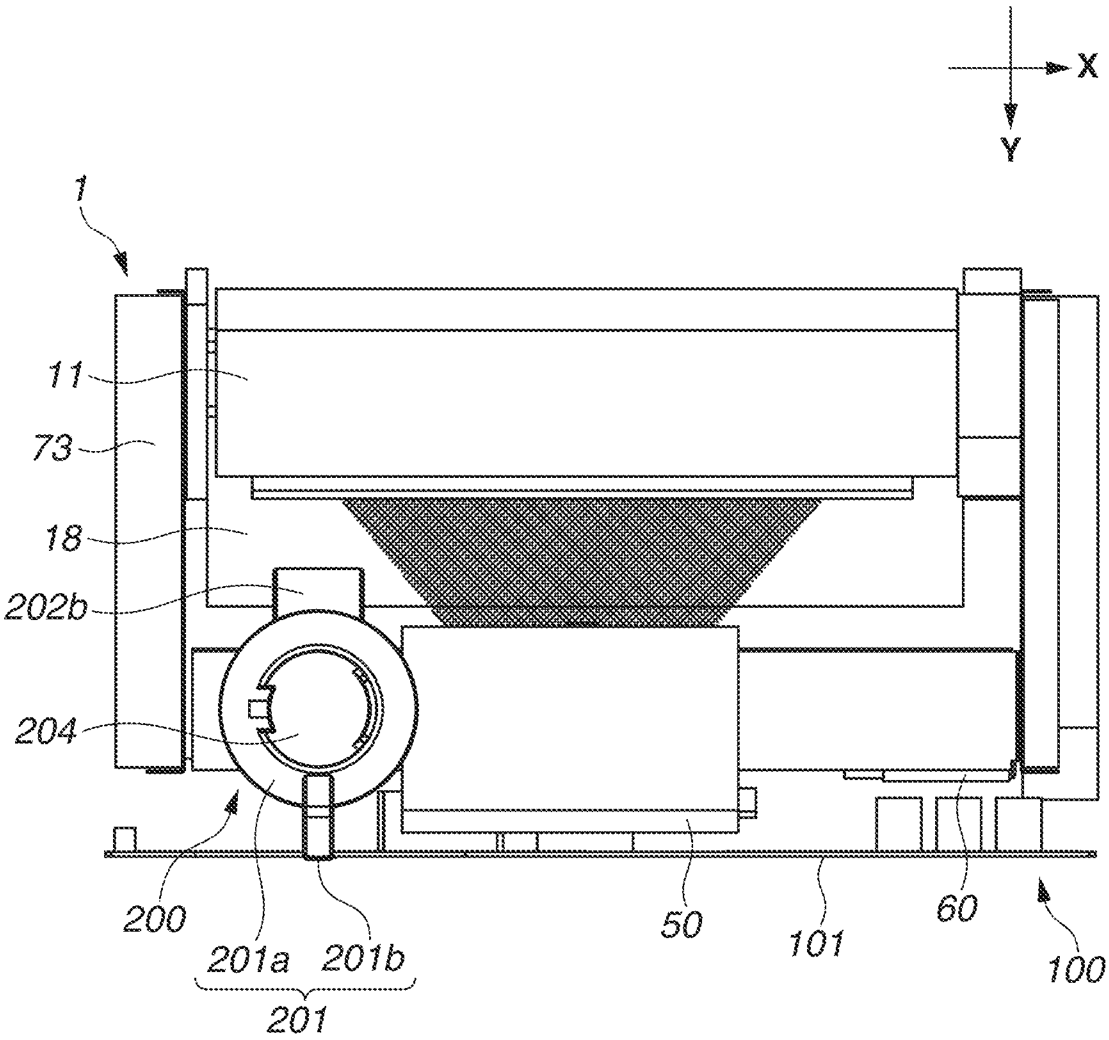
FIG. 5 is a top view of a replenishment portion, a scanner unit, and a photosensitive drum according to the first exemplary embodiment.
Figure 6:
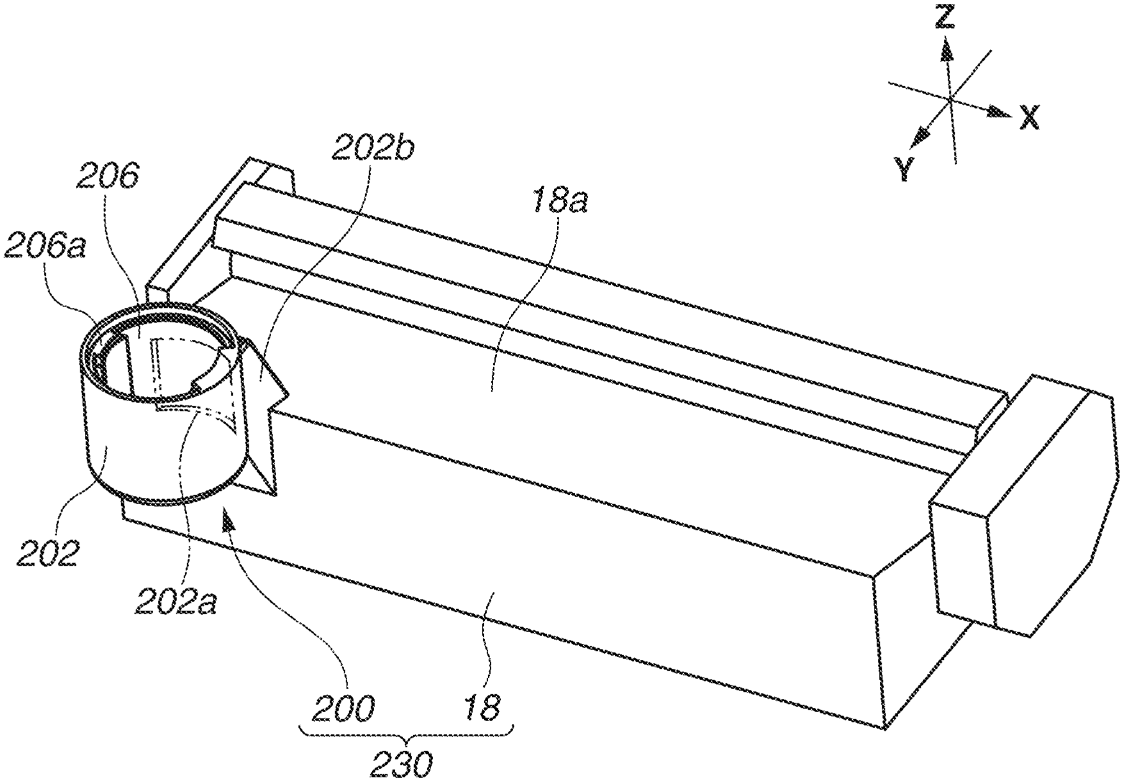
FIG. 6 is a perspective view of the development container according to the first exemplary embodiment.

FIG. 4 is a cross-sectional view of the development container 230 of the image forming apparatus 1. FIG. 5 is a top view of the image forming apparatus 1 (replenishment portion 200 and scanner unit 50) in the state where the exterior is removed. FIG. 6 is a perspective view of the development container 230. In FIG. 6, a lever 201 of the replenishment portion 200 and some portions associated with the lever 201 are omitted.

As illustrated in FIGS. 4 to 6, the development container 230 includes the containing unit 18 and the replenishment portion 200. The replenishment portion 200 includes a lever 201, a cylindrical passage portion 202, and a main body shutter 206 (see FIG. 7A).

In the passage portion 202, an extending portion 202*b* extending to the containing unit 18 and a side surface opening 202*a* connected to the extending portion 202*b* are formed. The replenishment pack 210 is attached to the replenishment portion 200, and toner discharged from the replenishment pack 210 is supplied to the containing unit 18 via an opening 206*a* on the main body shutter 206 and the side surface opening 202*a* on the passage portion 202 and the extending portion 202*b*.

The extending portion 202*b* is connected to one end of the containing unit 18 in the longitudinal direction of the development container 230, i.e., the X-direction. Inside the containing unit 18, as illustrated in FIG. 4, an agitation member 60 that rotates about a rotary shaft 60*a* extending in the X-direction is disposed. The agitation member 60 includes a blade member 60*b* fixed to the rotary shaft 60*a*. Rotation of the agitation member 60 being driven by a motor 311 (see FIGS. 15A and 15B) agitates and levels toner in the containing unit 18 which has been replenished with toner from the replenishment pack 210, and also conveys toner to the development roller 12. While, in the present exemplary embodiment, the agitation member 60 includes the rotary shaft 60*a* and the blade member 60*b*, an agitation member having a spiral shape may be used as a component for spreading the toner over the entire length of the containing unit 18.

The agitation member 60 has the function of circulating toner, which has not been used in development and has been scraped off from the development roller 12, in the containing unit 18 and uniformizing toner in the containing unit 18. The agitation member 60 is not limited to a form in which the agitation member 60 rotates. For example, an agitation member in a form in which the agitation member swings may be employed. Another agitation member may also be further disposed in addition to the agitation member 60.

On a side surface 18*a* of the containing unit 18 which is opposite to a side with the development roller 12, a remaining amount detection unit 312 (a toner remaining amount detection unit) for detecting the amount of toner in the containing unit 18 is disposed. The remaining amount detection unit 312 includes a light-emitting unit 312*a* and a light-receiving unit 312*b*. The light-emitting unit 312*a* and the light-receiving unit 312*b* are disposed next to each other in the X-direction. Light emitted from the light-emitting unit 312*a* passes through the inside of the containing unit 18 and is received by the light-receiving unit 312*b*. That is, the light-emitting unit 312*a* and the light-receiving unit 312*b* form an optical path Q1 inside the containing unit 18. The optical path Q1 extends in the X-direction. As the light-emitting unit 312*a* and the light-receiving unit 312*b*, a light-emitting element and a light-receiving element, respectively, may be placed inside the containing unit 18, or the light-emitting element and the light-receiving element, respectively, may be placed outside the containing unit 18, and a light-guiding portion may guide light to the inside and outside of the containing unit 18.

Further, the light-emitting unit 312*a* and the light-receiving unit 312*b* are disposed in a center portion of the containing unit 18 in the X-direction. More specifically, the light-emitting unit 312*a* and the light-receiving unit 312*b* are disposed within an area corresponding to a laser passing space in the X-direction. Disposing the light-emitting unit 312*a* and the light-receiving unit 312*b* in this way in the center portion of the containing unit 18 allows the remaining amount of toner in the containing unit 18 to be excellently detected. More specifically, because a developer (toner) may unevenly gather at end portions of the containing unit 18 in the X-direction while the developer less unevenly gathers at the center portion of the containing unit 18, the actual remaining amount of toner can be detected.

While, in the present exemplary embodiment, an LED is used as the light-emitting unit 312*a*, and a phototransistor that enters an on state by light from the LED is used as the light-receiving unit 312*b*, the configuration is not limited to this. For example, a halogen lamp or a fluorescent light may be applied to the light-emitting unit 312*a*, and a photodiode or an avalanche photodiode may be applied to the light-receiving unit 312*b*.

The light-receiving unit 312*b* that is a phototransistor receives light emitted from the light-emitting unit 312*a* and outputs a signal (a current) according to the amount of the received light. The signal is converted into a voltage, and the voltage is input to a control unit 302 (see FIGS. 15A and 15B). That is, the light-receiving unit 312*b* changes the output value based on the amount of toner (developer) stored in the containing unit 18.

Based on the level of the input voltage, the control unit 302 determines whether the light-receiving unit 312*b* has received light from the light-emitting unit 312*a*. Based on lengths of time in which the light-receiving unit 312*b* has detected beams of light when the agitation member 60 agitates toner in the containing unit 18 for a certain time, the control unit 302 calculates the amount of toner (the amount of developer) in the containing unit 18. More specifically, a read-only memory (ROM) 302*b* of the control unit 302 in FIG. 15A stores in advance a table to be used for outputting the remaining amount of toner based on the light reception time when toner is conveyed by the agitation member 60. The control unit 302 predicts and calculates the remaining amount of toner based on the table.

More specifically, as illustrated in FIG. 4, the optical path Q1 of the remaining amount detection unit 312 is set to overlap a rotation trajectory TC of the agitation member 60 when viewed in the axis direction of the rotary shaft of the agitation member 60. In other words, light emitted from the light-emitting unit 312*a* of the remaining amount detection unit 312 passes through the inside of the containing unit 18 within the rotation trajectory TC of the agitation member 60 when viewed in the axis direction of the agitation member 60. The time in which the optical path Q1 is shielded from light by toner conveyed by the agitation member 60 when the agitation member 60 rotates once, i.e., the time in which the light-receiving unit 312*b* does not detect light from the light-emitting unit 312*a*, changes depending on the remaining amount of toner.

More specifically, when the remaining amount of toner is great, the optical path Q1 is likely to be blocked by toner, and consequently, the time in which the light-receiving unit 312*b* receives light is short. On the other hand, when the remaining amount of toner is small, conversely, the time in which the light-receiving unit 312*b* receives light is long. Thus, based on the light reception time of the light-receiving unit 312*b* as described above, the control unit 302 can determine the level of the remaining amount of toner in the containing unit 18.

The method for detecting and estimating the remaining amount of toner is not limited to the above method, and various known methods for detecting and estimating the remaining amount of toner can be employed. For example, the remaining amount of toner may be detected and estimated in such a manner that two or more metal plates or conductive resin sheets extending in the longitudinal direction of the development roller are disposed on an inner wall of the containing unit 18, and the capacitance between two of the metal plates or conductive resin sheets are measured. Alternatively, a load cell may be disposed to support the development container 230 from below, and the remaining amount of toner may be calculated based on a weight measured by the load cell.

Figure 7A:
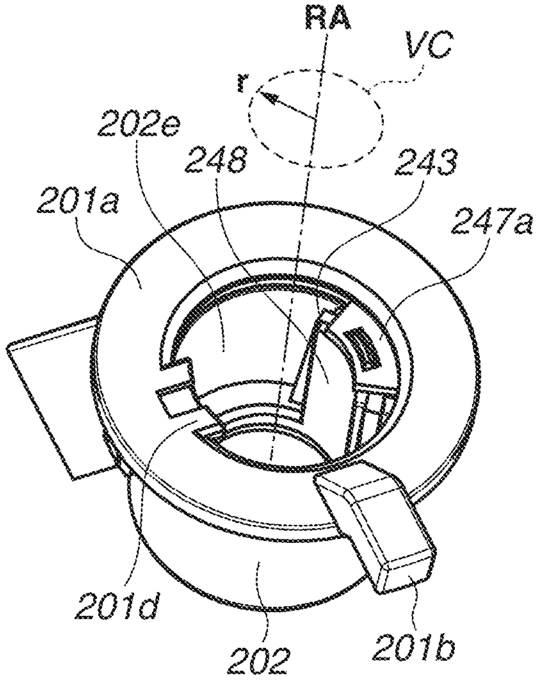
FIG. 7A is a perspective view of the replenishment portion when a lever is at an operation position and a replenishment position according to the first exemplary embodiment.
Figure 7B:
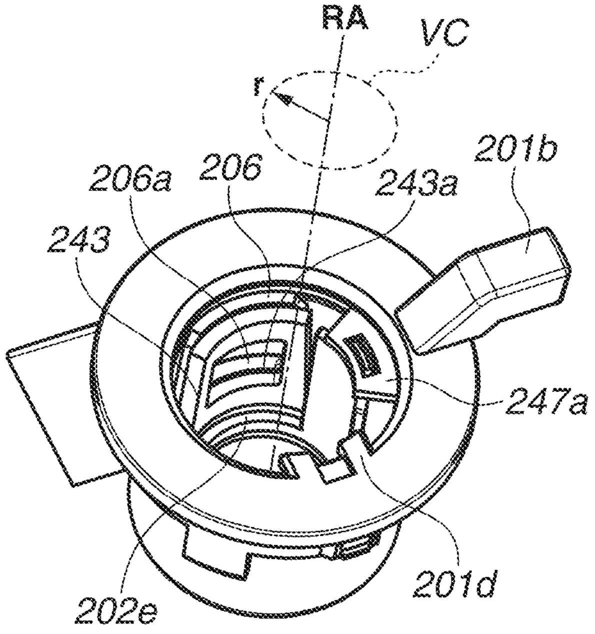
FIG. 7B is a perspective view of the replenishment portion when the lever is at the operation position and the replenishment position according to the first exemplary embodiment.
Figure 7C:
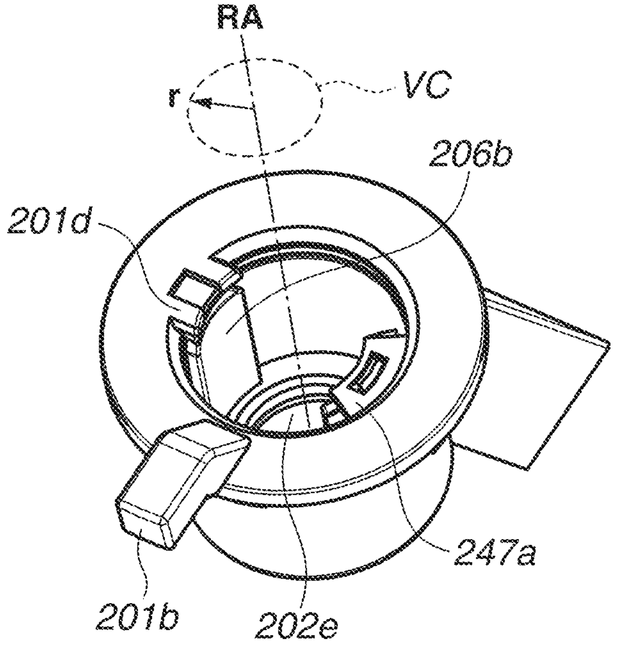
FIG. 7C is a perspective view of the replenishment portion when the lever is at the operation position and the replenishment position according to the first exemplary embodiment.
Figure 8A:
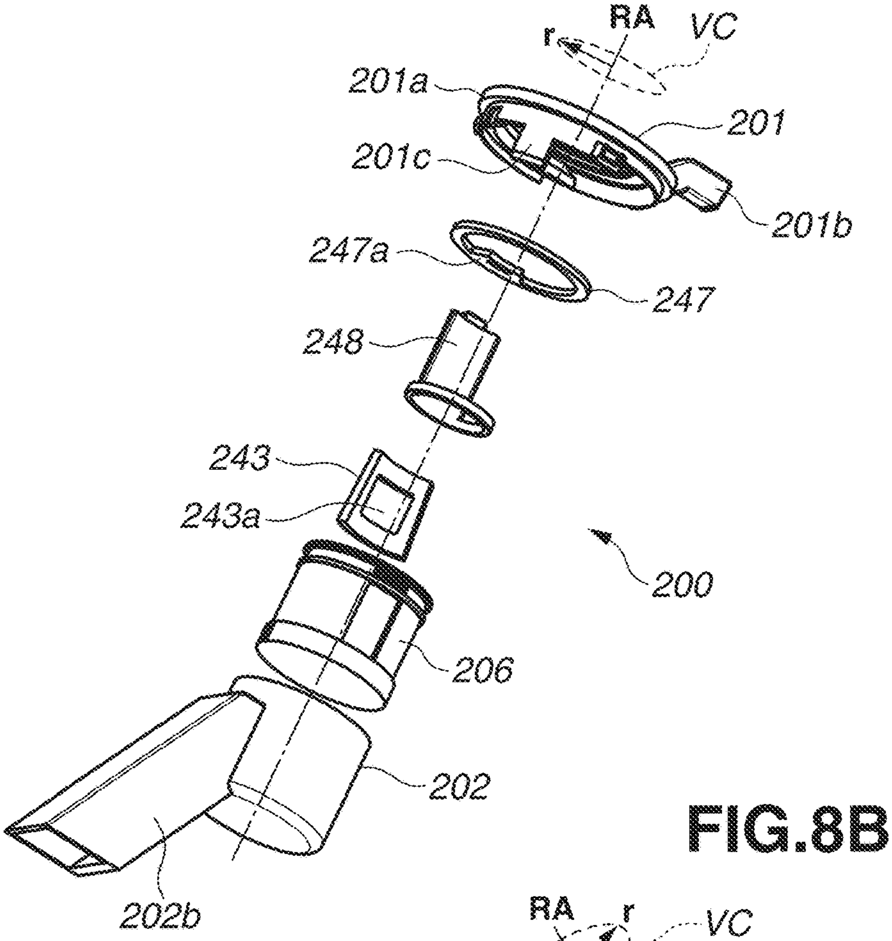
FIG. 8A is an exploded perspective view of the replenishment portion.
Figure 8B:
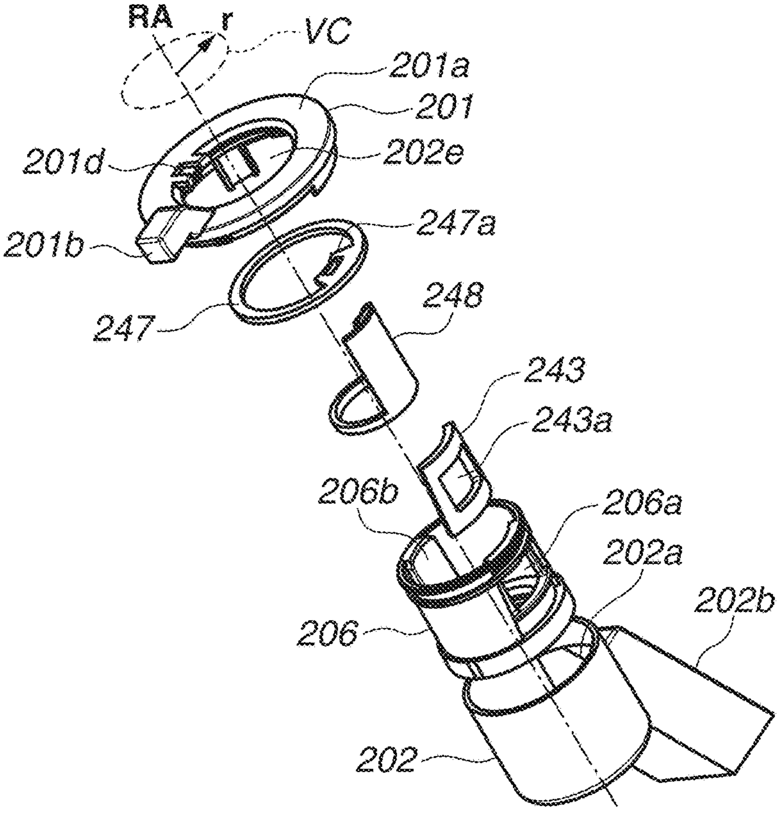
FIG. 8B is an exploded perspective view of the replenishment portion.

A description is given of the detailed configuration of the replenishment portion 200 to which the replenishment pack 210 is attached. FIGS. 7A and 7B are perspective views of the replenishment portion 200 as viewed in the same direction. FIG. 7C is a perspective view of the replenishment portion 200 as viewed from an angle different from that in FIG. 7A. FIGS. 8A and 8B are exploded perspective views of the replenishment portion 200.

As illustrated in FIGS. 8A and 8B, the replenishment portion 200 includes the lever 201 (an operation portion), a rotation restriction portion 247, a cover 248, a sealing portion 243, the main body shutter 206, and the passage portion 202.

The main body shutter 206 is configured to be rotatable about a rotational axis RA with respect to the passage portion 202. The main body shutter 206 is disposed inside the passage portion 202 having a tubular form. In the main body shutter 206, the main body shutter opening 206*a* is provided. The main body shutter 206 also includes a main body shutter engagement portion 206*b* configured to be engaged with a main body shutter engaged portion 214*b* of a container shutter 214. If a virtual circle centered on the rotational axis RA is a virtual circle VC, the main body shutter engagement portion 206*b* is a protruding portion protruding inward in a radial direction r of a virtual circle VC.

In a case where the main body shutter 206 is at a closed position (a second closed position) illustrated in FIG. 7A, the main body shutter opening 206*a* and the side surface opening 202*a* (FIG. 8B) of the passage portion 202 do not overlap (communicate with) each other. The side surface opening 202*a* is blocked by the main body shutter 206, and toner is not discharged to the extending portion 202*b* of the passage portion 202. In a case where the main body shutter 206 is at an opened position (second opened position) illustrated in FIG. 7B, the main body shutter opening 206*a* and the side surface opening 202*a* of the passage portion 202 overlap (communicate with) each other. Thus, toner supplied from the replenishment pack 210 attached to the replenishment portion 200 can pass through the main body shutter opening 206*a* and the side surface opening 202*a* and be discharged to the extending portion 202*b* of the passage portion 202.

Although the details will be described below, the main body shutter 206 moves (rotates) between the closed position and the opened position by the lever 201 being rotated in the state where the replenishment pack 210 is attached to the replenishment portion 200. That is, the main body shutter 206 moves from the closed position illustrated in FIG. 7A to the opened position illustrated in FIG. 7B by the user rotating the lever 201 by 90 degrees counterclockwise.

The sealing portion 243 is stuck to the periphery of the main body shutter opening 206*a* on the inner peripheral surface of the main body shutter 206. The sealing portion 243 has a seal opening 243*a*, and the sealing portion 243 is attached to the main body shutter 206 in such a manner that the seal opening 243*a* overlaps (communicates with) the main body shutter opening 206*a*. In a case where the main body shutter 206 is at the opened position, the sealing portion 243 seals a gap between the periphery of an insertion portion opening 212*a* of an insertion portion 212 of the replenishment pack 210 and the main body shutter 206.

The rotation restriction portion 247 is disposed inside the main body shutter 206 in the radial direction r of the virtual circle VC. The rotation restriction portion 247 includes a rotation restriction portion 247*a* that restricts the rotation of the insertion portion 212 of the replenishment pack 210 about the rotational axis RA in engagement with a rotation restricted portion 212*b* of the insertion portion 212.

The lever 201 includes a ring portion 201*a* (an annular portion) having an insertion opening 202*e* into which the insertion portion 212 of the replenishment pack 210 is inserted, and a holding portion 201*b* disposed integrally with the ring portion 201*a*. The holding portion 201*b* is a protruding portion protruding outward in the radial direction r of the virtual circle VC from the ring portion 201*a*. The lever 201 includes a lever engagement portion 201*d* protruding inward in the radial direction r of the virtual circle VC from the inner peripheral surface forming the insertion opening 202*e*. As illustrated in FIG. 7C, when the main body shutter 206 is at the closed position, the lever engagement portion 201*d* is in the same phase with the main body shutter engagement portion 206*b* in the circumferential direction of the virtual circle VC. In other words, when the main body shutter 206 is at the closed position, the lever engagement portion 201*d* overlaps the main body shutter engagement portion 206*b* when viewed in the direction of the rotational axis RA.

As illustrated in FIG. 7A, the cover 248 is a portion that covers the main body shutter opening 206*a* when the main body shutter 206 is at the closed position.

In image formation on the recording material P, the agitation member 60 (see FIG. 4) agitates toner in the containing unit 18, and the main body shutter 206 blocks the side surface opening 202*a* of the passage portion 202 so that toner does not leak from the side surface opening 202*a*. Thus, in image formation, the lever 201 is at an operation position (a first position) illustrated in FIG. 7A so that the main body shutter 206 is at the closed position. On the other hand, in toner replenishment from the replenishment pack 210 to the containing unit 18, the side surface opening 202*a* is required to be opened. Thus, in toner replenishment, the lever 201 is at a replenishment position (a second position) illustrated in FIG. 7B so that the main body shutter 206 is at the opened position.

Figure 9A:
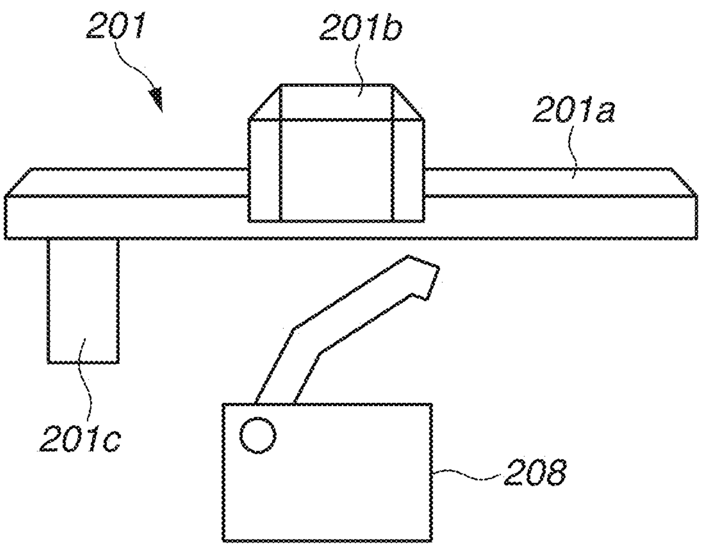
FIG. 9A is a diagram illustrating a state of a switch when the lever is at the operation position and the replenishment position according to the first exemplary embodiment.
Figure 9B:
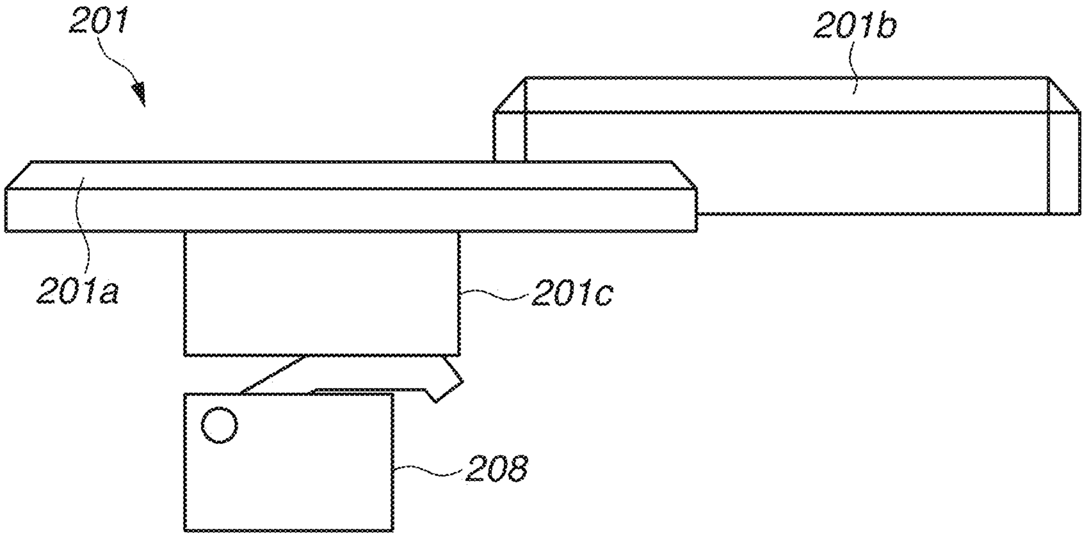
FIG. 9B is a diagram illustrating a state of a switch when the lever is at the operation position and the replenishment position according to the first exemplary embodiment.

FIGS. 9A and 9B are side views illustrating the lever 201 and a switch 208 (a detection unit). As illustrated in FIGS. 8A and 9A, the lever 201 includes a detected rib 201*c* formed integrally with the ring portion 201*a*. The switch 208 as a sensor is disposed below the ring portion 201*a*. When the lever 201 is at the operation position, the switch 208 is not in contact with the detected rib 201*c*, and the switch 208 is off. When the lever 201 is at the replenishment position, the switch 208 is in contact with the detected rib 201*c*, and the switch 208 is on.

Turning on and off of the switch 208 is used to detect whether the lever 201 is at the operation position or the replenishment position. That is, in response to the switch 208 switching from the off state to the on state, it can be detected that the lever 201 moves from the operation position to the replenishment position. In response to the switch 208 switching from the off state to the on state, it can be detected that the lever 201 moves from the replenishment position to the operation position.

[Replenishment Pack]

Figure 11A:
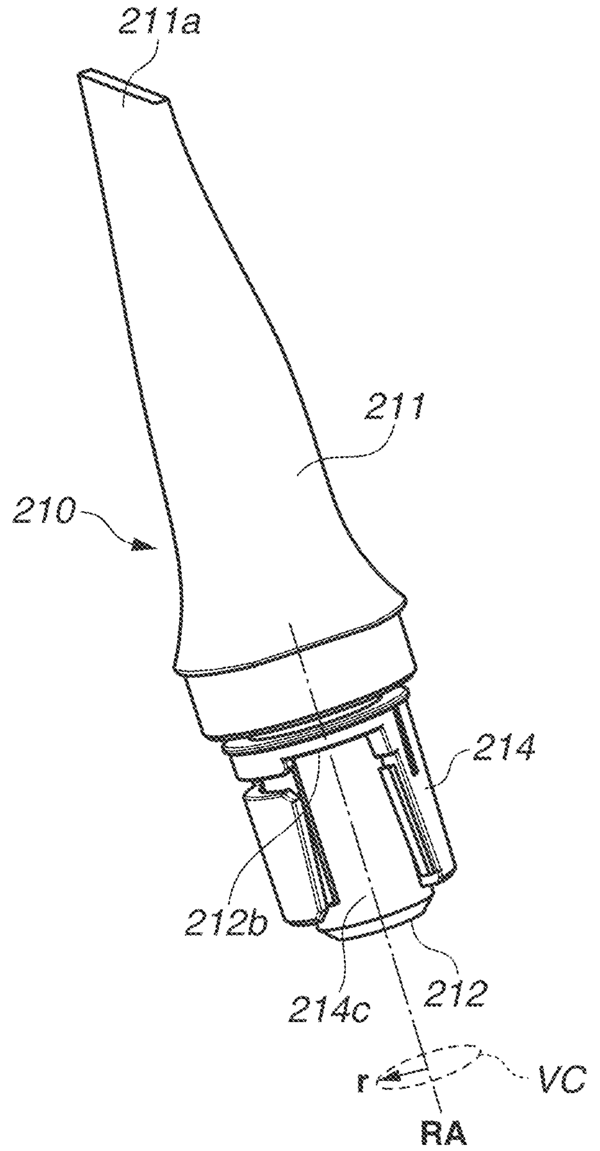
FIG. 11A is a perspective view of a replenishment pack according to the first exemplary embodiment.
Figure 11B:
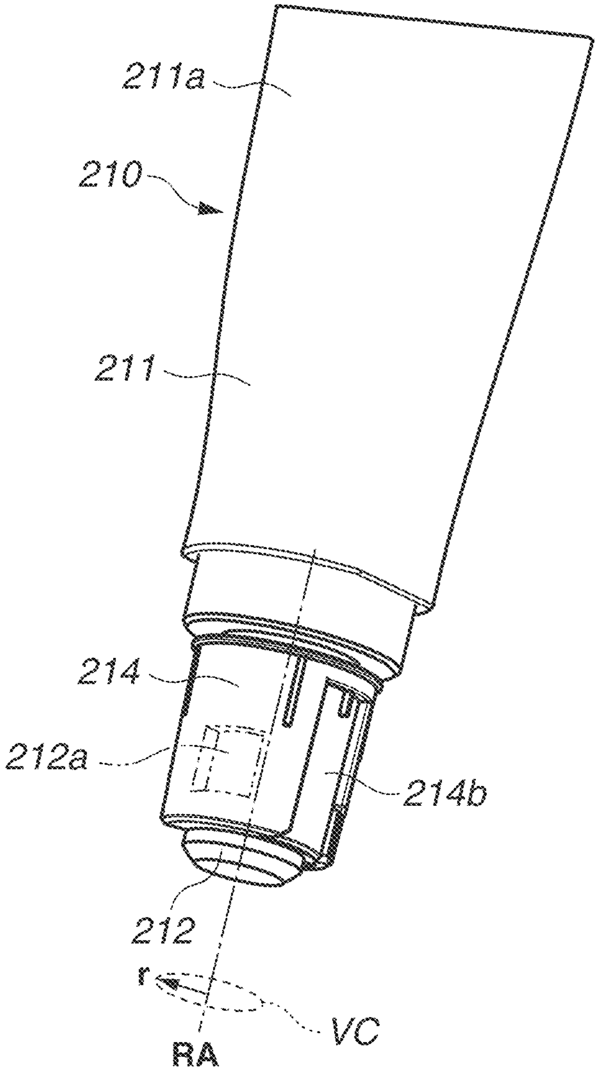
FIG. 11B is a perspective view of the replenishment pack according to the first exemplary embodiment.
Figure 12A:
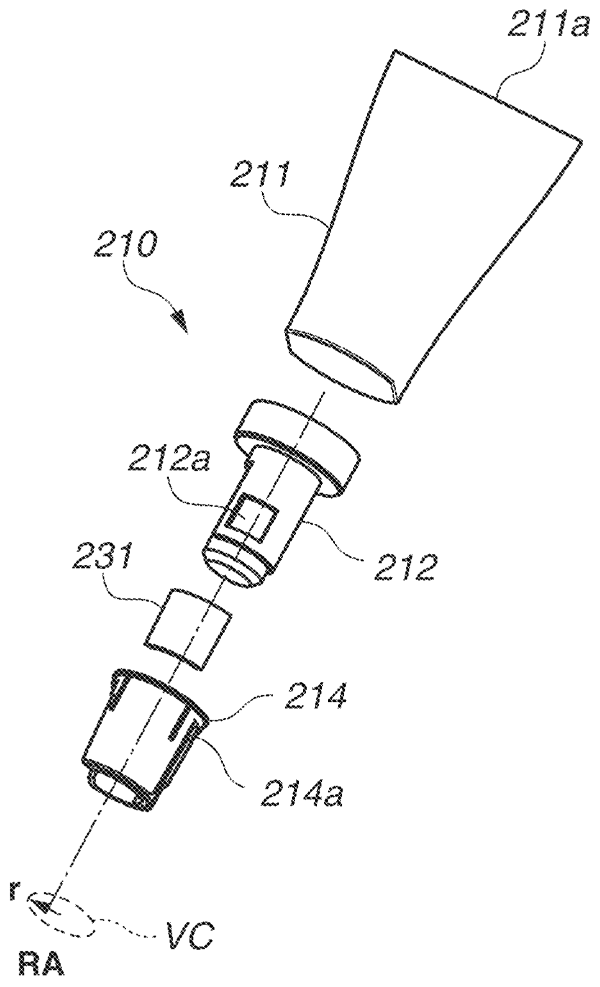
FIG. 12A is an exploded perspective view of the replenishment pack according to the first exemplary embodiment.
Figure 12B:
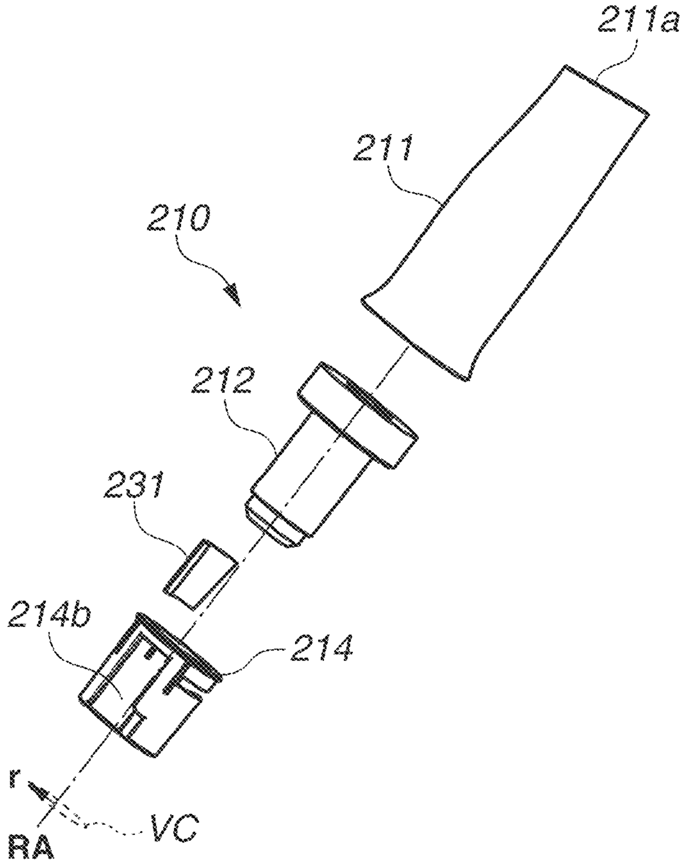
FIG. 12B is an exploded perspective view of the replenishment pack according to the first exemplary embodiment.
Figure 12C:
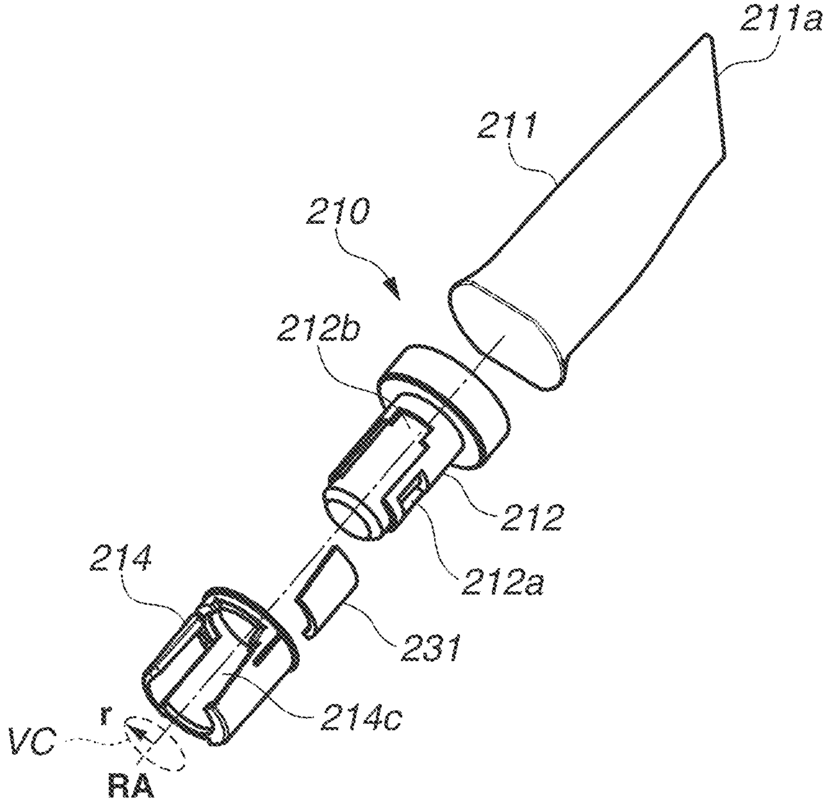
FIG. 12C is an exploded perspective view of the replenishment pack according to the first exemplary embodiment.

With reference to FIGS. 11A and 11B and FIGS. 12A, 12B, and 12C, the configuration of the replenishment pack 210 is described. FIGS. 11A and 11B are perspective views of the replenishment pack 210 when viewed from angles different from each other. FIGS. 12A, 12B, and 12C are exploded perspective views of the replenishment pack 210 when viewed from angles different from each other. The insertion portion opening 212*a* is covered by the container shutter 214 and actually not seen, and therefore is indicated by a dotted line.

As illustrated in FIGS. 11A and 11B and FIGS. 12A, 12B, and 12C, the replenishment pack 210 includes a pouch 211, an insertion portion 212 (end portion member), the container shutter 214, and a container shutter seal 231. The rotational axis RA is a rotational axis about which the container shutter 214 rotates with respect to the insertion portion 212.

The pouch 211 is a container obtained by pouching a polypropylene sheet into a bag and stores toner inside. The pouch 211 is formed such that the thickness tapers down toward the opposite side of the insertion portion 212. The pouch 211 includes a pouch end portion 211*a* extending in a direction orthogonal to the rotational axis RA at its end. Although a pouch is used as a toner storage portion of the replenishment pack 210 in the present exemplary embodiment, a resin bottle or a paper or vinyl container may be used.

The insertion portion 212 is a tubular portion capable of being inserted into the insertion opening 201*e* of the lever 201. The side surface of the insertion portion 212 extending in the direction of the rotational axis RA has an insertion portion opening 212*a*. The insertion portion 212 is a portion disposed in an end portion of the pouch 211 in the direction of the rotational axis RA and for discharging toner in the pouch 211 to outside the replenishment pack 210 through the insertion portion opening 212*a*. The insertion portion 212 further includes a rotation restricted portion 212*b*. The rotation restricted portion 212*b* is engaged with the rotation restriction portion 247*a* of the rotation restriction portion 247 of the replenishment portion 200, to restrict the rotation of the insertion portion 212 about the rotational axis RA.

The container shutter 214 is a cylindrical member configured to be concentric with the insertion portion 212. The container shutter 214 is disposed to be rotatable about the rotational axis RA with respect to the insertion portion 212 outside the insertion portion 212 in the radial direction r of the virtual circle VC and is configured to move (rotate) between a closed position (first closed position) where the insertion portion opening 212*a* is closed and an opened position (first opened position) where the insertion portion opening 212*a* is opened. In the container shutter 214, a container shutter opening 214*c* (opening portion) is formed. When the container shutter 214 is at the opened position, the container shutter opening 214*c* and the insertion portion opening 212*a* overlap (communicate with) each other. In this state, toner can be discharged from the replenishment pack 210 to outside the replenishment pack 210 through the container shutter opening 214*c* and the insertion portion opening 212*a*. When the container shutter 214 is at the closed position, the insertion portion opening 212*a* is closed by the container shutter 214. In this state, toner is not discharged from the replenishment pack 210 to outside the replenishment pack 210. When the replenishment pack 210 is not attached to the image forming apparatus 1, the container shutter 214 is at the closed position. When the container shutter 214 is at the closed position, the rotation restricted portion 212*b* of the insertion portion 212 is exposed through the container shutter opening 214*c*. This will be described below.

On the outer peripheral surface of the container shutter 214, the main body shutter engaged portion 214*b* is disposed and is engaged with the lever engagement portion 201*d* of the lever 201 and the main body shutter engagement portion 206*b* of the main body shutter 206 when the replenishment pack 210 is attached to the replenishment portion 200. The main body shutter engaged portion 214*b* is a recessed portion recessed inward in the radial direction r of the virtual circle VC from the outer peripheral surface of the container shutter 214 and extends to the end of the container shutter 214 on the side far from the pouch 211 in the direction of the rotational axis RA. In response to the main body shutter engaged portion 214*b* receiving a force in a rotational direction about the rotational axis RA from the lever engagement portion 201*d* of the lever 201, the container shutter 214 is rotated with respect to the insertion portion 212. The main body shutter engaged portion 214*b* does not need to be a recessed portion as long as the container shutter 214 is configured to be rotatable by the rotation of the lever 201 in engagement with the lever 201.

The container shutter seal 231 is stuck to the inner peripheral surface of the container shutter 214. When the container shutter 214 is at the closed position, the container shutter seal 231 seals a portion between the periphery of the insertion portion opening 212*a* of the insertion portion 212 and the container shutter 214.

[Attachment of Replenishment Pack and Replenishment]

A description is given of a method for attaching the replenishment pack 210 to the replenishment portion 200 and a method for toner replenishment using the replenishment pack 210.

Figure 13A:
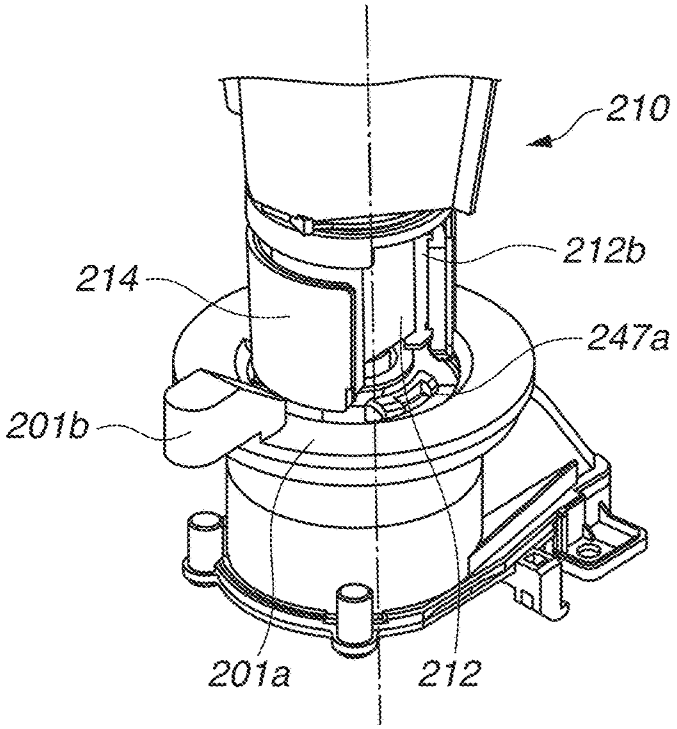
FIG. 13A is a perspective view of the replenishment pack and the replenishment portion immediately before the replenishment pack according to the first exemplary embodiment is attached to the replenishment portion.
Figure 13B:
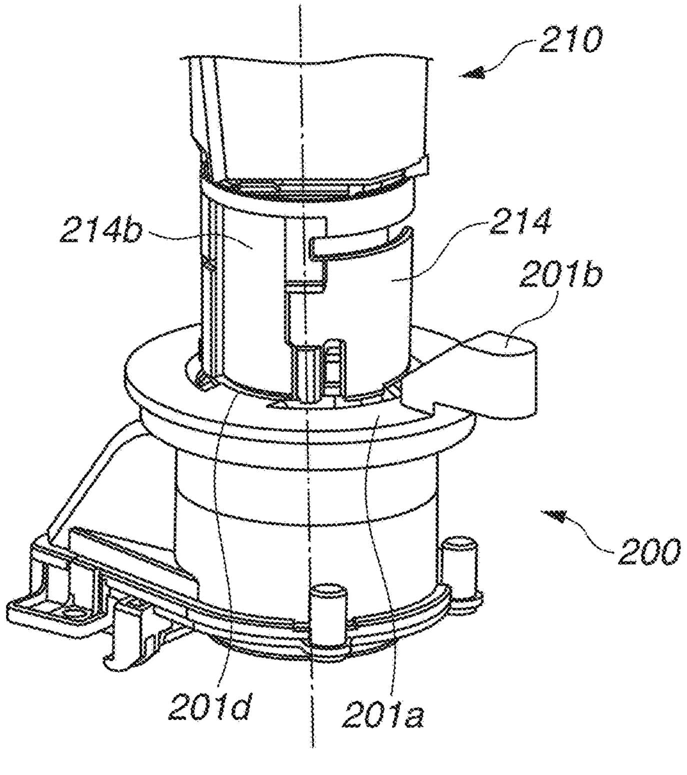
FIG. 13B is a perspective view of the replenishment pack and the replenishment portion immediately before the replenishment pack according to the first exemplary embodiment is attached to the replenishment portion.

FIGS. 13A and 13B are perspective views of the replenishment portion 200 of the image forming apparatus 1 and the replenishment pack 210 immediately before the replenishment pack 210 is attached to the replenishment portion 200 as viewed from directions different from each other. As illustrated in FIGS. 13A and 13B, when the replenishment pack 210 is attached to the replenishment portion 200 of the image forming apparatus 1, two alignments need to be performed on the replenishment pack 210 with respect to the replenishment portion 200. These alignments are performed in the rotational direction about the rotational axis RA and can be performed in the state where the container shutter 214 is at the closed position. As illustrated in FIG. 13A, the first alignment is the alignment between the rotation restricted portion 212*b* of the insertion portion 212 exposed through the container shutter opening 214*c* of the container shutter 214 and the rotation restriction portion 247*a* of the rotation restriction portion 247. As illustrated in FIG. 13B, the second alignment is the alignment between the main body shutter engaged portion 214*b* and the lever engagement portion 201*d*. When the second alignment is successful, this means that the alignment between the main body shutter engaged portion 214*b* and the main body shutter engagement portion 206*b* is also successful. This is because the lever engagement portion 201*d* and the main body shutter engagement portion 206*b* overlap each other when viewed in the direction of the rotational axis RA.

Figure 10:
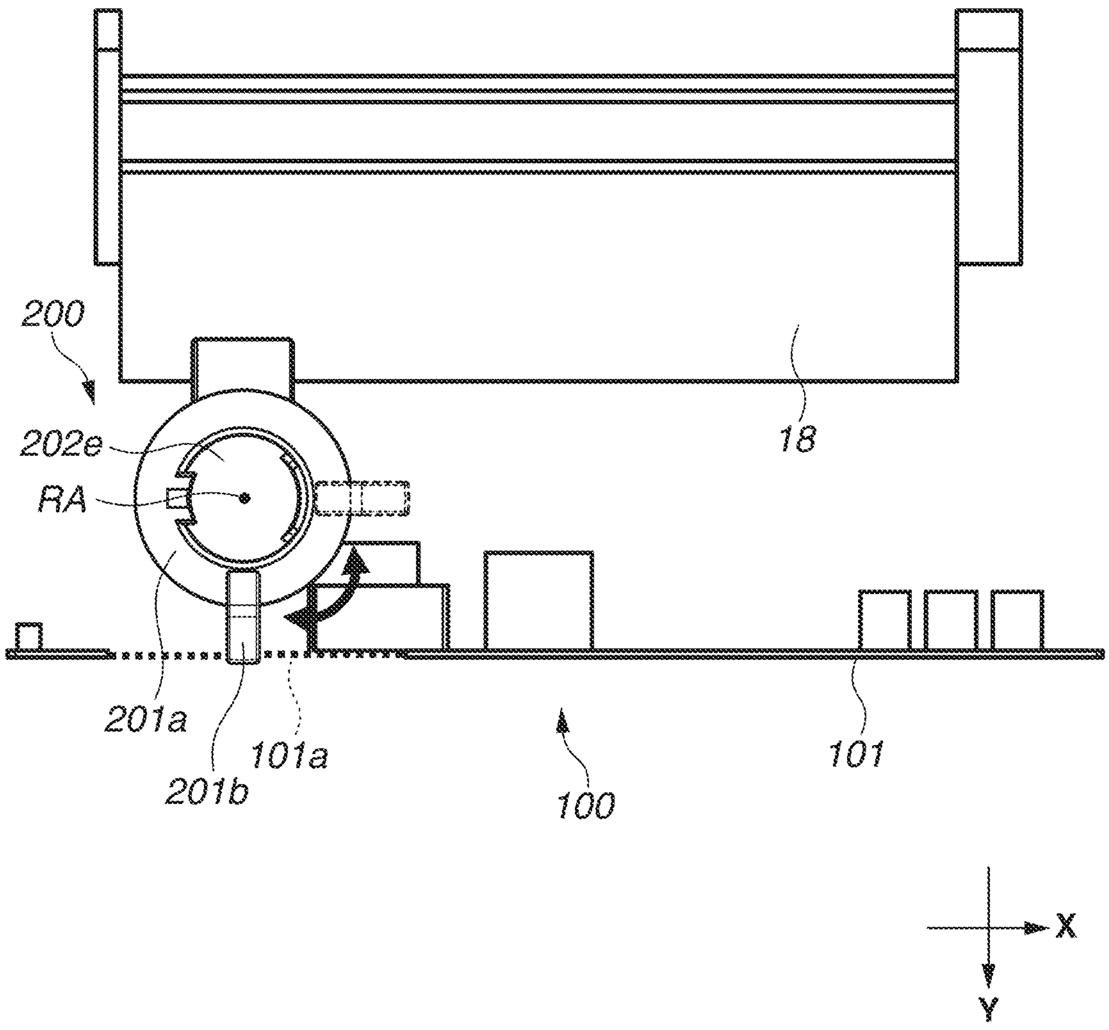
FIG. 10 is a diagram illustrating a position of a holding portion of the lever when the lever is at the operation position and the replenishment position according to the first exemplary embodiment.

In the state where the attachment of the replenishment pack 210 to the replenishment portion 200 is completed, the main body shutter engaged portion 214*b* is engaged with the lever engagement portion 201*d* and also engaged with the main body shutter engagement portion 206*b* of the main body shutter 206. The rotation restricted portion 212*b* of the insertion portion 212 is engaged with the rotation restriction portion 247*a*. In this state, as illustrated in FIG. 10, the user rotates the lever 201 by 90 degrees clockwise by holding the holding portion 201*b*, whereby the lever 201 is rotated from the first position to the second position with respect to the insertion portion 212. In this operation, the main body shutter engaged portion 214*b* is pressed by the lever engagement portion 201*d*, and the container shutter 214 is rotated from the closed position to the opened position with the lever 201. The main body shutter engagement portion 206*b* is pressed by the main body shutter engaged portion 214*b*, and the main body shutter 206 is rotated from the closed position to the opened position with the lever 201 and the container shutter 214. The main body shutter 206 is configured to be rotated via the container shutter 214, which means that the main body shutter 206 does not rotate even in a case where the lever 201 is rotated from the first position to the second position in the state where the replenishment pack 210 is not attached to the replenishment portion 200. More specifically, the main body shutter 206 does not open even if the lever 201 is operated by the user in the state where the replenishment pack 210 is not attached.

Figure 14:
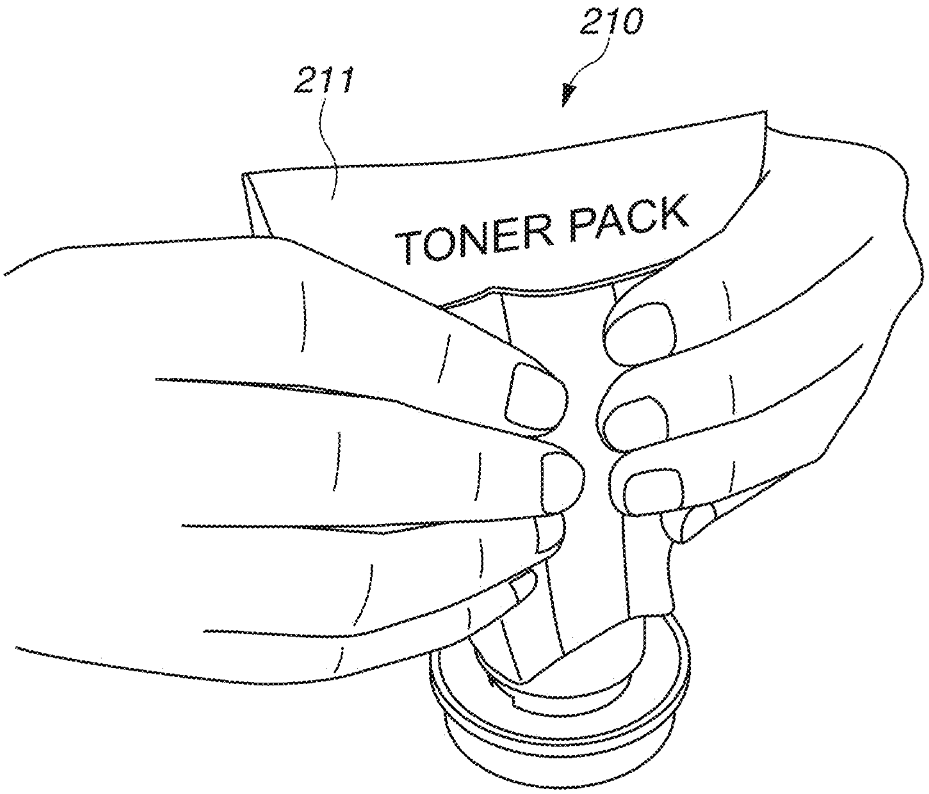
FIG. 14 is a diagram illustrating a state where a user softens the replenishment pack according to the first exemplary embodiment.

When the lever 201 is at the second position in the state where the replenishment pack 210 is attached to the replenishment portion 200, the container shutter 214 and the main body shutter 206 are both at the opened positions, and the container shutter opening 214*c* and the main body shutter opening 206*a* communicate with each other. In this state, the user softens the pouch 211 using their hands as illustrated in FIG. 14, whereby toner in the pouch 211 moves to the insertion portion 212 with air. Then, the toner having moved to the insertion portion 212 passes through the insertion portion opening 212*a*, the container shutter opening 214*c*, and the main body shutter opening 206*a* and is supplied to the containing unit 18 of the development container 230.

In a case where the replenishment pack 210 is to be detached from the replenishment portion 200 after completion of the toner replenishment, then as illustrated in FIG. 10, the user rotates the lever 201 by 90 degrees counterclockwise by holding the holding portion 201*b*. By this operation, the lever 201 is rotated from the second position to the first position with respect to the insertion portion 212. In this operation, the main body shutter engaged portion 214*b* is pressed by the lever engagement portion 201*d*, and the container shutter 214 is rotated from the opened position to the closed position with the lever 201. The main body shutter engagement portion 206*b* is pressed by the main body shutter engaged portion 214*b*, and the main body shutter 206 is rotated from the opened position to the closed position with the lever 201 and the container shutter 214. The replenishment pack 210 is detached from the replenishment portion 200 in the state where the lever 201 is at the first position. In the state where the replenishment pack 210 is detached from the replenishment portion 200, the container shutter 214 is at the closed position. Thus, toner is prevented from leaking from the insertion portion opening 212*a* of the replenishment pack 210.

[Control Unit]

Figure 15A:
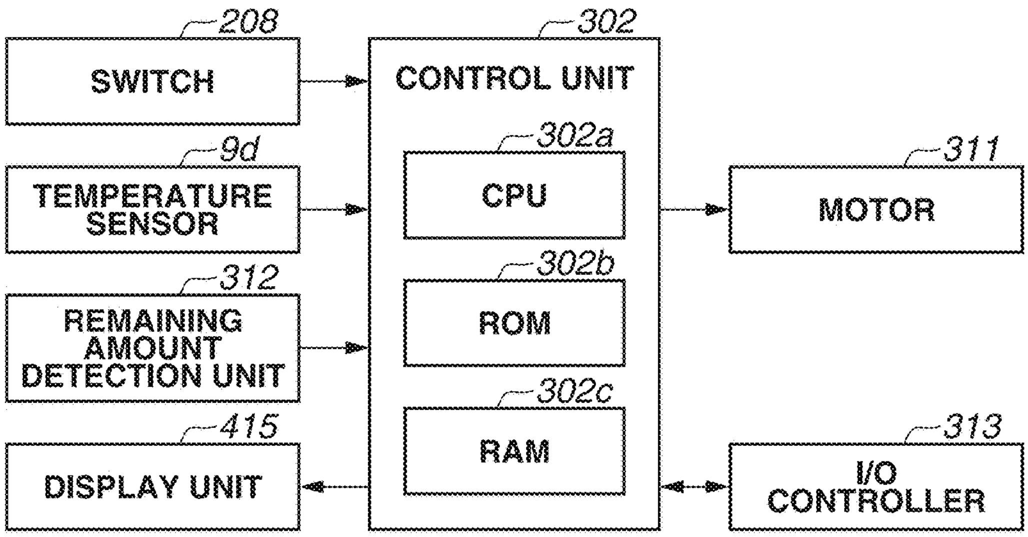
FIG. 15A is a control block diagram according to the first exemplary embodiment.

FIG. 15A is a block diagram illustrating the hardware configuration of the control unit 302 disposed in the image forming apparatus 1. The control unit 302 includes a central processing unit (CPU) 302*a* serving as a calculation device, the ROM 302*b*, and a random-access memory (RAM) 302*c*. The CPU 302*a* reads various programs stored in the ROM 302*b* and executes processing. The RAM 302*c* is used as a work area for the CPU 302*a*.

To the input side of the control unit 302, the switch 208, a temperature sensor 9*d*, and the remaining amount detection unit 312 are connected. The temperature sensor 9*d* detects the temperature of the fixing nip of the fixing unit 9. To the output side of the control unit 302, the motor 311 serving as an actuator and a display unit 415 are connected. To the control unit 302, an input/output (I/O) controller 313 serving as an input/output port connected to an external device is also connected.

The motor 311 drives the agitation member 60 and various rollers (including the photosensitive drum 11, the development roller 12, and various conveyance rollers) in the image forming apparatus 1. While, in the present exemplary embodiment, all the rollers in the image forming apparatus 1 and the agitation member 60 are driven by a single motor 311, the configuration is not limited to this. For example, the agitation member 60 and some of the rollers in the image forming apparatus 1 may be driven by the motor 311, and the other rollers may be driven by another motor. Alternatively, a configuration in which the motor 311 is directly connected to all the rollers via drive transmission members such as gears, and an electromagnetic clutch is disposed between the motor 311 and the agitation member 60 may be employed. In this case, an actuator that turns on and off the driving of the agitation member 60 is the electromagnetic clutch. Alternatively, the actuator may be a solenoid that turns on and off a mechanical clutch disposed between the motor 311 and the agitation member 60.

Figure 15B:
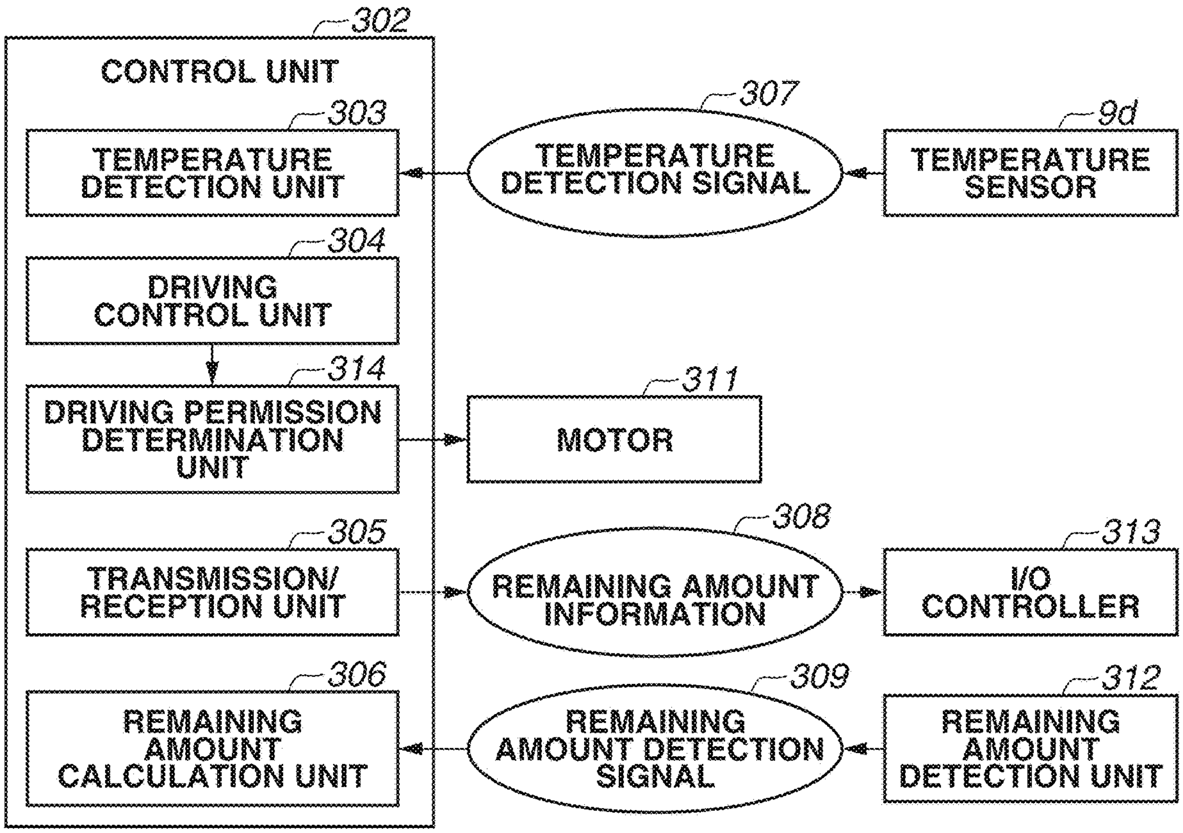
FIG. 15B is the control block diagram according to the first exemplary embodiment.

FIG. 15B is a block diagram illustrating the functional configuration of the control unit 302 disposed in the image forming apparatus 1. The control unit 302 includes a temperature detection unit 303, a driving control unit 304, a transmission/reception unit 305, a remaining amount calculation unit 306, and a storage unit. Based on a temperature detection signal 307 from the temperature sensor 9*d*, the temperature detection unit 303 detects the current temperature of the fixing unit 9. Based on a printing operation, initial control or the like in the image forming apparatus 1, the driving control unit 304 controls the driving of the motor 311 where necessary.

Based on the state of the image forming apparatus 1, a driving permission determination unit 314 determines whether to permit driving of the motor 311. For example, in a jam state where the recording material P is jammed in the image forming apparatus 1 or in a breakdown state, the driving permission determination unit 314 does not permit driving of the motor 311. Based on the determination of the driving permission determination unit 314, the driving control unit 304 drives the motor 311.

Based on a remaining amount detection signal 309 output from the remaining amount detection unit 312 disposed in the containing unit 18, the remaining amount calculation unit 306 calculates the amount of toner stored in the containing unit 18. The transmission/reception unit 305 transmits and receives information to and from the I/O controller 313 that receives image information from a host, such as a personal computer (PC) (not illustrated). In the present exemplary embodiment, the transmission/reception unit 305 transmits particularly the remaining amount of toner stored in the containing unit 18 as remaining amount information 308.

The remaining amount of toner is transmitted in percentage representation where, for example, the amount of toner that can be stored in the containing unit 18 is 100%. Although depending on the configuration of the remaining amount detection unit 312, the remaining amount detection signal 309 is, for example, an analog signal based on the voltage which changes based on the remaining amount of development, or for example, a pulse signal based on a pulse which is output at constant periods and the H/L pulse width of which changes according to the remaining amount of toner.

[Display of Remaining Amount of Toner]

The display of the remaining amount of toner according to the present exemplary embodiment is described. As illustrated in FIG. 1, the display unit 415 is disposed on the right side of the front surface of the housing 72 of the image forming apparatus 1 and displays information regarding the remaining amount of toner in the containing unit 18 of the development container 230.

Figure 19A:
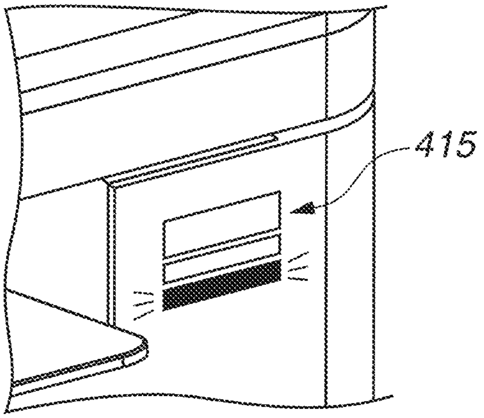
FIG. 19A is a diagram illustrating display of a remaining amount of toner on a display unit of the image forming apparatus according to the first exemplary embodiment.
Figure 19B:
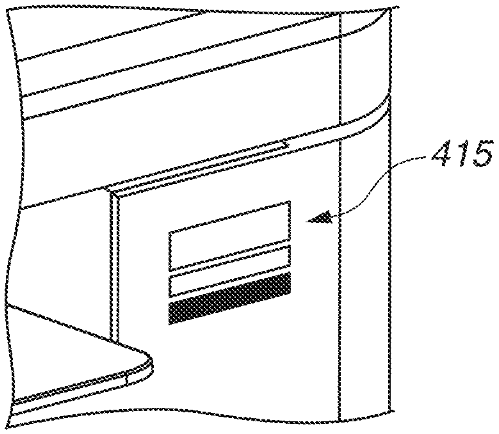
FIG. 19B is a diagram illustrating display of the remaining amount of toner on the display unit of the image forming apparatus according to the first exemplary embodiment.
Figure 19C:
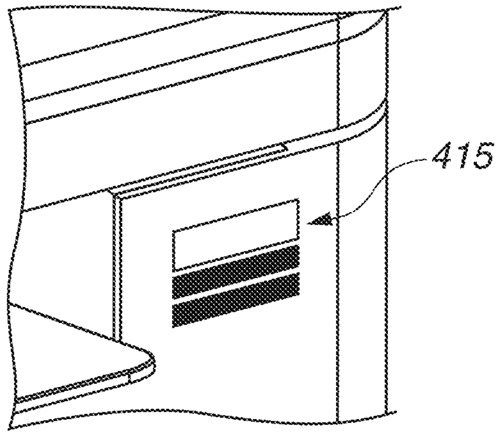
FIG. 19C is a diagram illustrating display of the remaining amount of toner on the display unit of the image forming apparatus according to the first exemplary embodiment.
Figure 19D:
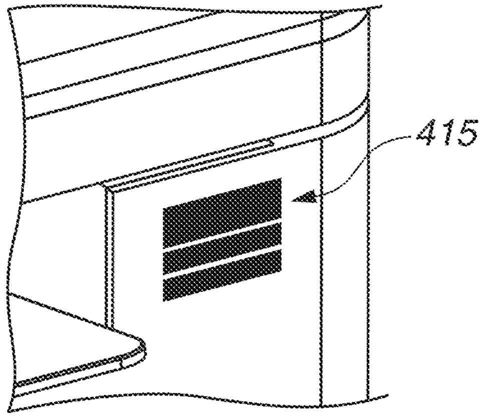
FIG. 19D is a diagram illustrating display of the remaining amount of toner on the display unit of the image forming apparatus according to the first exemplary embodiment.

FIGS. 19A, 19B, 19C, and 19D illustrate enlarged views of the display unit 415. As illustrated in FIGS. 19A, 19B, 19C, and 19D, the display unit 415 is a panel member including a plurality of (three in the present exemplary embodiment) graduations arranged one on top of the other. As illustrated in FIG. 19A, in a case where only the lower graduation blinks, this indicates that the remaining amount of toner in the containing unit 18 is at a nearly out level. As illustrated in FIG. 19B, in a case where only the lower graduation is turned on, this indicates that the remaining amount of toner in the containing unit 18 is at a low level. As illustrated in FIG. 19C, in a case where the lower and middle graduations are turned on and the upper graduation is turned off, this indicates that the remaining amount of toner in the containing unit 18 is at a middle (mid) level. As illustrated in FIG. 19D, in a case where all the three graduations are turned on, this indicates that the remaining amount of toner in the containing unit 18 is at a full level.

The display unit 415 is not limited to a liquid crystal panel, and may include a light source, such as an LED or an incandescent light and a diffusion lens. Alternatively, a configuration in which the display unit 415 is not separately provided may be employed, and the remaining amount of toner may be displayed using graduations as described in the present exemplary embodiment on a display of an operation unit. While the display unit 415 according to the present exemplary embodiment includes three graduations, the number of graduations is not limited to this, and may be appropriately set according to the configuration of the image forming apparatus.

A description is given of the changing of the display of the display unit 415 according to the present exemplary embodiment. A schematic diagram illustrates thresholds for changing the display of the display unit 415 in accordance with a detection result of the remaining amount of toner in the containing unit 18 of the development container 230 and the display patterns of the display unit 415.

Figure 20:
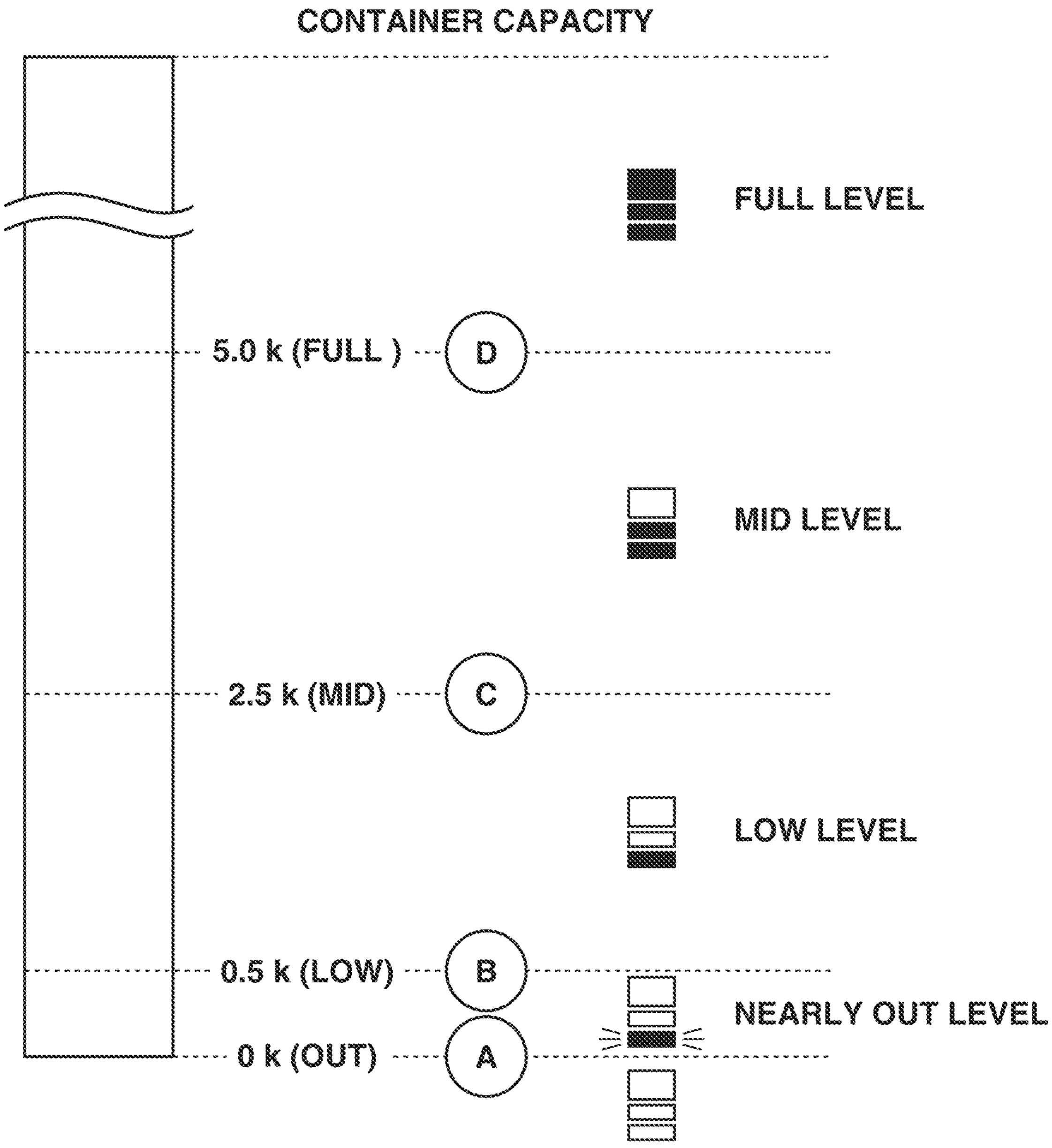
FIG. 20 is a diagram illustrating relationships between thresholds for changing the display of the remaining amount of toner and an amount of toner in a storage portion according to the first exemplary embodiment.

As illustrated in FIG. 20, in response to a change in the remaining amount of toner in the containing unit 18 in accordance with the toner consumption or the toner replenishment in the image forming mode, the display of the display unit 415 is changed based on a result of detection by the remaining amount detection unit 312. Specifically, in a case where the result of detecting the remaining amount of toner in the containing unit 18 by the remaining amount detection unit 312 is greater than or equal to a threshold D (first threshold), the control unit 302 sets the display of the display unit 415 to the full level (first state or first display) where all the three graduations are turned on. In a case where the result of detecting the remaining amount of toner in the containing unit 18 by the remaining amount detection unit 312 is less than the threshold D, the control unit 302 sets the display of the display unit 415 to the mid level (second state or second display) where the two graduations are turned on. In the present exemplary embodiment, the value of the threshold D is set to 5.0 k. Various thresholds described below including the threshold D may be appropriately set in accordance with the volume of toner to be supplied or various configurations of the image forming apparatus.

In a case where the result of detecting the remaining amount of toner in the containing unit 18 by the remaining amount detection unit 312 is less than a threshold C (2.5 k in the present exemplary embodiment), the control unit 302 sets the display of the display unit 415 to the low level (third state or third display) where the single graduation is turned on. In a case where the result of detecting the remaining amount of toner in the containing unit 18 by the remaining amount detection unit 312 is less than a threshold B (0.5 k in the present exemplary embodiment), the control unit 302 sets the display of the display unit 415 to the nearly out level (fourth state or fourth display) where the single lower graduation blinks. Then, in a case where the result of detecting the remaining amount of toner in the containing unit 18 by the remaining amount detection unit 312 is less than a threshold A (0 k in the present exemplary embodiment), the control unit 302 determines that the toner in the containing unit 18 runs out, and then sets the display of the display unit 415 to a toner out state where all the three graduations are turned off.

That is, in a case where the result of detecting the remaining amount of toner in the containing unit 18 by the remaining amount detection unit 312 is more than or equal to 2.5 k and less than 5.0 k, the control unit 302 sets the display of the display unit 415 to the second state. In a case where the result of detecting the remaining amount of toner in the containing unit 18 by the remaining amount detection unit 312 is more than or equal to 0.5 k and less than 2.5 k, the control unit 302 sets the display of the display unit 415 to the third state. In a case where the result of detecting the remaining amount of toner in the containing unit 18 by the remaining amount detection unit 312 is more than or equal to 0 k and less than 0.5 k, the control unit 302 sets the display of the display unit 415 to the fourth state. If it is determined that there is no remaining amount of toner, the control unit

302 sets the display of the display unit 415 to the state where all the graduations are turned off.

The interval (the difference) between the amount of toner corresponding to the threshold D and the amount of toner corresponding to the threshold C, i.e., the interval (the difference) between the amounts of toner corresponding to thresholds related to the changing of the display of the top graduation, according to the present exemplary embodiment is set to the replenishment amount corresponding to a single replenishment pack 210. Similarly, the interval (the difference) between the amount of toner corresponding to the threshold C and the amount of toner corresponding to the threshold A, i.e., the interval between the amounts of toner corresponding to thresholds related to the changing of the display of the middle graduation, according to the present exemplary embodiment is also set to the replenishment amount corresponding to a single replenishment pack 210. Setting the intervals between the amounts of toner corresponding to thresholds related to the changing of the display of a graduation in the above-described way helps the user to easily identify the number of replenishment packs 210 to be usable for replenishment. This improves the visibility of the status whether the user performs toner replenishment.

[Replenishment Mode]

Figure 16:
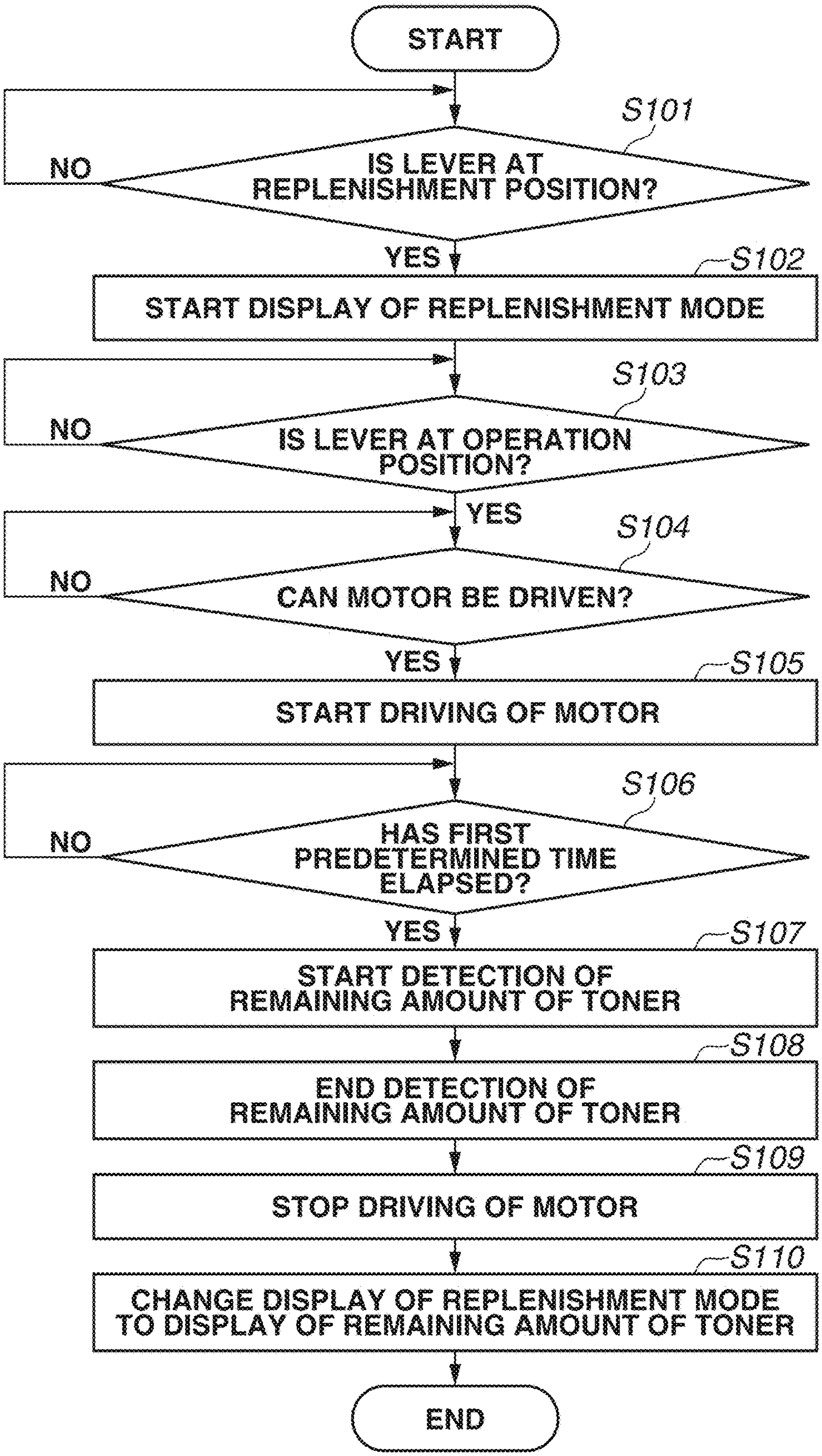
FIG. 16 is a diagram illustrating a control flow in a replenishment mode according to the first exemplary embodiment.

With reference to a control flowchart in FIG. 16, a replenishment mode according to the present exemplary embodiment is described. The replenishment mode according to the present exemplary embodiment is started by the opening/closing detection unit detecting that the discharge tray 14 in FIG. 3B has moved from the closed position to the opened position. In a case where the replenishment mode is started, then as illustrated in FIG. 16, in step S101, based on the detection result of the switch 208, the control unit 302 determines whether the lever 201 is at the replenishment position. In the present exemplary embodiment, as described above, the replenishment pack 210 is attached to the replenishment portion 200, the lever 201 is rotated from the operation position to the replenishment position, and toner can be supplied from the replenishment pack 210 to the containing unit 18. In the state where the lever 201 is at the replenishment position, the user softens the pouch 211 of the replenishment pack 210 and replenishes the containing unit 18 with toner from the replenishment pack 210. After the rotation of the lever 201 from the operation position to the replenishment position has been detected via the switch 208, in step S102, the display unit 415 starts the display of the replenishment mode.

Figure 21A:
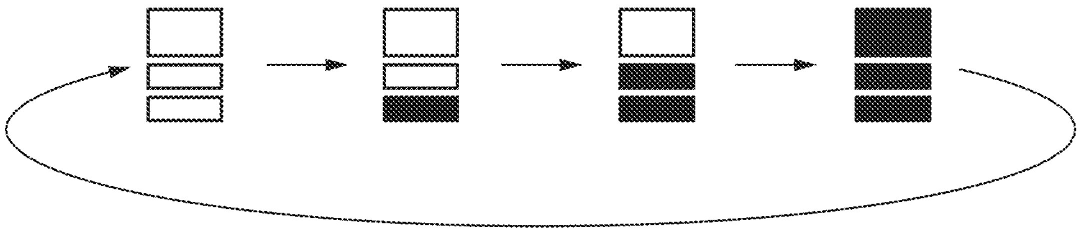
FIG. 21A is a diagram illustrating display of the replenishment mode on the display unit according to the first exemplary embodiment.
Figure 21B:
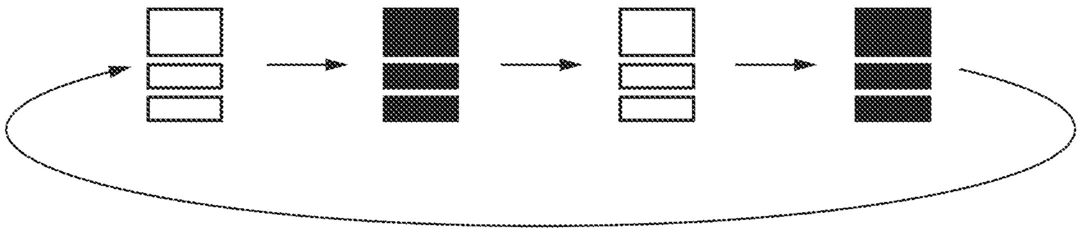
FIG. 21B is a diagram illustrating display of the replenishment mode on the display unit according to the first exemplary embodiment.

The display of the replenishment mode on the display unit 415 in step S102 is described. FIGS. 21A and 21B illustrate the display of the replenishment mode on the display unit 415 according to the present exemplary embodiment. The display of the replenishment mode is to notify the user that the replenishment mode is being executed. Examples of the display of the replenishment mode include a pattern where the state with the three graduations of the display unit 415 being turned on one by one is repeated as illustrated in FIG. 21A, and a pattern where the state with all the three graduations being turned off and being turned on are repeated as illustrated in FIG. 21B. The present invention, however, is not limited to these two patterns. For example, a pattern where the above first to fourth states of the display unit 415 are randomly changed, including a pattern where the state with the three graduations being turned off one by one from the state with all the three graduations being turned on is repeated, is also applicable. As the display of the replenishment mode, a configuration in which at least two of the five states including the first to fourth states illustrated in FIGS. 19A, 19B, 19C, and 19D and the all-turned-off state where none of the graduations is turned on are repeatedly displayed may be employed. With this configuration, display corresponding to none of the above five states can be performed, which helps the user to visually check that the replenishment mode is currently executed.

The description returns to the control flowchart in FIG. 16. After the display unit 415 has started the display of the replenishment mode in step S102, in step S103, the control unit 302 determines whether the lever 201 is at the operation position, based on the detection result of the switch 208. More specifically, the control unit 302 determines whether the lever 201 has been moved from the replenishment position to the operation position. In a case where the determination is YES in step S103, in step S104, the control unit 302 determines whether the motor 311 can be driven. In the state where a printing operation can be performed without delay if the motor 311 is driven, it is determined that the motor 311 can be driven. In the state where a jam will be exacerbated if the motor 311 is driven, it is determined that the motor 311 cannot be driven. Also, if a failure occurs in the image forming apparatus 1, it is determined that the motor 311 cannot be driven. In a case where all the rollers in the image forming apparatus 1 and the agitation member 60 are driven by the single motor 311 as in the present exemplary embodiment, step S104 is necessary. However, in a case where the rollers related to the conveyance of the recording material are not driven, step S104 may be omitted.

In a case where the determination is YES in step S104, in step S105, the control unit 302 starts the driving of the motor 311. In the driving, the agitation member 60 disposed in the containing unit 18 is driven. In step S106, the control unit 302 determines whether a first predetermined time has elapsed from when the driving of the motor 311 has been started. In the present exemplary embodiment, the first predetermined time is set to three seconds. Toner in the containing unit 18 is leveled in three seconds. The leveling of the toner in the containing unit 18 by the agitation member 60 is executed to prepare for the detection of the remaining amount of toner to be executed in the subsequent steps, but may be omitted.

In a case where the determination is YES in step S106, in step S107, the control unit 302 causes the remaining amount detection unit 312 to start the detection of the remaining amount of toner in the containing unit 18. In step S108, the detection of the remaining amount of toner ends, and in step S109, the control unit 302 stops the driving of the motor 311. In step S110, the control unit 302 changes the display of the replenishment mode on the display unit 415 to the display of the remaining amount of toner. The display of the remaining amount of toner is display reflecting the result of the detection of the remaining amount of toner that has been executed by the remaining amount detection unit 312 between steps S107 and S108. The display method according to the detection of the remaining amount of toner is as described above. The detection of the remaining amount of toner in step S108 and the driving of the motor 311 in step S109 may be ended at the same time. The above-described steps are executed, and the replenishment mode ends.

In a case of using the replenishment pack 210 according to the present exemplary embodiment, to replenish the containing unit 18 of the development container 230 with toner from the replenishment pack 210, the user may need to perform replenishment work including softening the pouch 211. In the replenishment mode according to the present exemplary embodiment, driving sounds are not generated from the motor 311 and gears for driving the agitation member 60 while the user performs the replenishment work, which is effective at preventing the user from hesitating to perform the replenishment work.

In the present exemplary embodiment, the replenishment pack 210 including the pouch 211 is used. The present invention, however, is not limited to this. For example, the effects of the present exemplary embodiment can also be obtained by a resin container that pushes toner to outside by the user pushing a plunger into the resin container, or a resin container that discharges toner to outside by the user tapping or squeezing the resin container.

Second Exemplary Embodiment

A second exemplary embodiment of the present invention is described. In the second exemplary embodiment, the control in the replenishment mode according to the first exemplary embodiment is modified. The configurations of an image forming apparatus 1 and a replenishment pack 210 are similar to those according to the first exemplary embodiment, and the redundant descriptions are omitted.

[Replenishment Mode]

Figure 17:
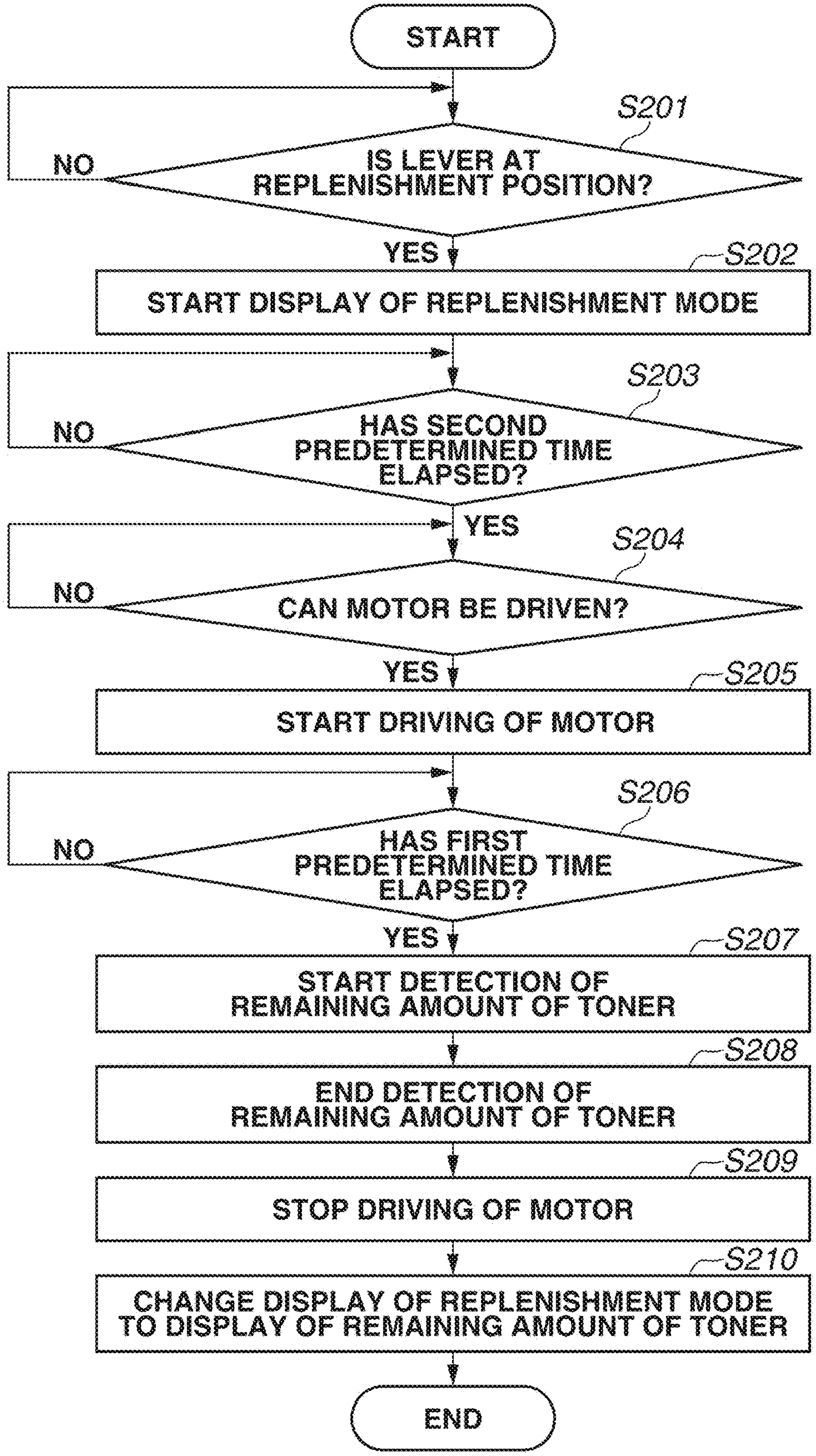
FIG. 17 is a diagram illustrating a control flow in a replenishment mode according to a second exemplary embodiment.

With reference to a control flowchart in FIG. 17, control in a replenishment mode according to the present exemplary embodiment is described. As illustrated in FIG. 17, in step S201, the control unit 302 determines whether the lever 201 is at the replenishment position, based on the detection result of the switch 208. In a case where it is determined that the lever 201 is at the replenishment position, in step S202, the display unit 415 starts the display of the replenishment mode. The display of the replenishment mode is similar to that in the first exemplary embodiment, and the redundant description is omitted.

In step S203, the control unit 302 determines whether a second predetermined time has elapsed after it has been detected that the lever 201 is at the replenishment position. In the present exemplary embodiment, the second predetermined time is 60 seconds. The second predetermined time is not limited to 60 seconds. The second predetermined time can be any seconds as long as the time is sufficient for detection of movement of the lever 201 from the operation position to the replenishment position, finishing of the replenishment work by the user softening the pouch 211 of the replenishment pack 210 as illustrated in FIG. 14, and movement of the lever 201 from the replenishment position to the operation position.

In a case where the determination is YES in step S203, the control unit 302 executes steps S204 to S210. Steps S204 to S210 are similar to steps S104 to S110 in the first exemplary embodiment, and the redundant descriptions are omitted.

In the replenishment mode according to the present exemplary embodiment, the driving of the motor 311 in which driving sounds are generated from the motor 311 and the gears is started after a sufficient time to move the lever 201 from the replenishment position to the operation position after the user has ended the replenishment work has elapsed. This is effective at preventing the user from hesitating to perform the replenishment work.

While, in the present exemplary embodiment, the replenishment pack 210 including the pouch 211 is used, similarly to the first exemplary embodiment, the present invention is not limited to this. In a case where a toner container that discharges toner by a plunger being pushed into the toner container is used instead of the replenishment pack 210, the second predetermined time may be set to a time sufficient for pushing the plunger into the toner container and rotating the toner container to rotate the container shutter from the opened position to the closed position.

Third Exemplary Embodiment

A third exemplary embodiment of the present invention is described. In the third exemplary embodiment, the control in the replenishment mode according to the first exemplary embodiment is modified. The configurations of an image forming apparatus 1 and a replenishment pack 210 are similar to those according to the first exemplary embodiment, and the redundant descriptions are omitted.

[Replenishment Mode]

Figure 18:
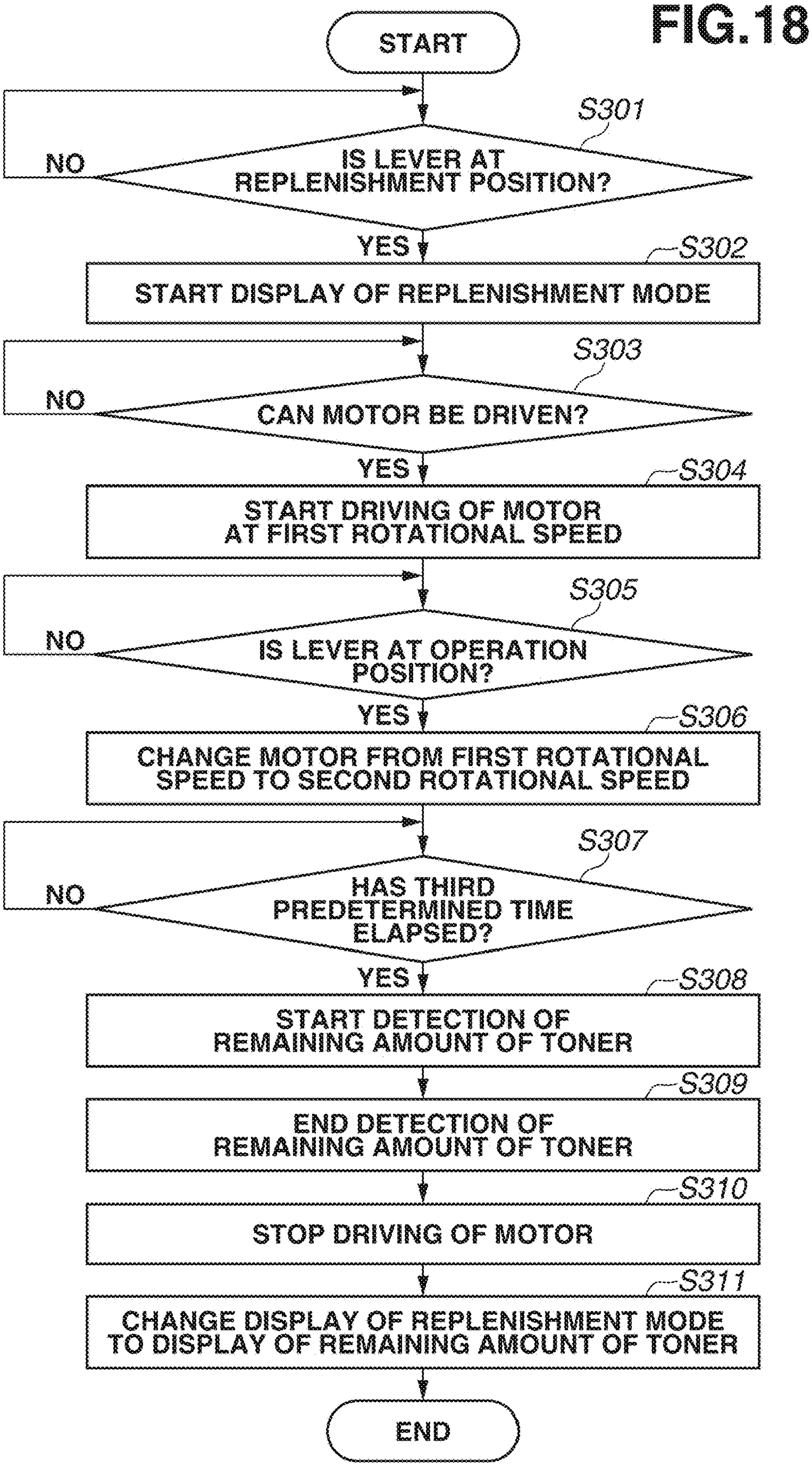
FIG. 18 is a diagram illustrating a control flow in a replenishment mode according to a third exemplary embodiment.

With reference to a control flowchart in FIG. 18, control in a replenishment mode according to the present exemplary embodiment is described. In step S301, the control unit 302 determines whether the lever 201 is at the replenishment position, based on the detection result of the switch 208. In a case where it is determined that the lever 201 is at the replenishment position, in step S302, the display unit 415 starts the display of the replenishment mode. The display of the replenishment mode is similar to that in the first exemplary embodiment, and the redundant description is omitted.

In step S303, the control unit 302 determines whether the motor 311 can be driven.

In a case where the determination is YES in step S303, in step S304, the control unit 302 starts the driving of the motor 311 at a first rotational speed. The first rotational speed is a speed that is two-thirds of the rotational speed (a second rotational speed) of the motor 311 in printing on plain paper by the image forming apparatus. The rotational speed of the agitation member 60 in rotation of the motor 311 at the first rotational speed is a rotational speed that is two-thirds of rotation speed of the motor 311 rotating at the second rotational speed.

In step S305, the control unit 302 determines whether the lever 201 is at the operation position, based on the detection result of the switch 208. That is, the control unit 302 determines whether the lever 201 is at the operation position. In a case where it is determined that the lever 201 is at the operation position, in step S306, the control unit 302 changes the rotational speed of the motor 311 from the first rotational speed to the second rotational speed faster than the first rotational speed. In step S307, the control unit 302 determines whether a third predetermined time has elapsed from when the rotational speed of the motor 311 has been changed from the first rotational speed to the second rotational speed in step S306. In the present exemplary embodiment, the third predetermined time is set to two seconds. Toner in the containing unit 18 is leveled in two seconds. Then, the control unit 302 executes steps S308 to S311. Steps S308 to S311 are similar to steps S107 to S110 in the first exemplary embodiment, and the redundant descriptions are omitted.

In the control in the replenishment mode according to the present exemplary embodiment, the motor 311 is driven at the first rotational speed lower than the second rotational speed from when the lever 201 is moved from the operation position to the replenishment position to when the lever 201 is moved from the replenishment position to the operation position. Since driving sounds generated from the motor 311 and the gears for driving the agitation member 60 while the user performs the replenishment work on the replenishment pack 210 are small, this configuration is effective at preventing the user from hesitating to perform the replenishment work. Further, since the rotational speed of the motor 311 is increased during a period after the lever 201 on which the user has completed the replenishment work has been moved to the operation position, downtime can be reduced.

While, in the present exemplary embodiment, the replenishment pack 210 including the pouch 211 is used, similarly to the first exemplary embodiment, the present invention is not limited to this. The first rotational speed may be any rotational speed as long as the speed is slower than the second rotational speed.

In each of the first to third exemplary embodiments, the lever 201 is operated in the state where the replenishment pack 210 is attached to the replenishment portion 200, which allows transition between the state where replenishment is possible and the state where replenishment is impossible. The present invention, however, is not limited to this. For example, a configuration in which the transition between the state where replenishment is possible and the state where replenishment is impossible is performed by rotation of the replenishment pack 210 itself instead of operation on the lever 201 may be employed. More specifically, a configuration in which the container shutter 214 and the main body shutter 206 rotate in conjunction with the rotation of the replenishment pack 210 may be employed.

The image forming apparatus according to each of the first to third exemplary embodiments includes the main body shutter. Alternatively, a removable cap may be used instead of the main body shutter. A configuration in which the user removes or moves the cap and then attaches the replenishment pack 210 to the replenishment portion 200 may be employed.

The present invention is not limited to the above exemplary embodiments, and can be changed and modified in various ways without departing from the spirit and the scope of the present invention. Thus, the following claims are appended to publicize the scope of the present invention.

According to the present invention, it is possible to further improve usability related to toner replenishment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus to which a toner container is attachable, the toner container storing toner and including an opening portion for toner replenishment and a shutter movable between a closed position where the opening portion is closed and an opened position where the opening portion is opened, the image forming apparatus comprising:

an attachment portion configured to receive attachment of the toner container;

a storage portion configured to store toner supplied from the opening portion of the toner container attached to the attachment portion;

an agitation member configured to agitate toner in the storage portion;

an actuator configured to drive the agitation member; and a control unit configured to control the actuator, wherein the attachment portion includes an operation portion, including an engagement portion configured to be engaged with the shutter in a state where the toner container is attached to the attachment portion, configured to move with the shutter by the engagement portion being engaged with the shutter, the operation portion being movable between a first position where the shutter is at the closed position and a second position where the shutter is at the opened position, and a detection unit configured to detect a movement of the operation portion, and wherein the control unit controls the actuator in such a manner that driving of the agitation member is started based on detection by the detection unit detecting a movement of the operation portion from the second position to the first position.

2. The image forming apparatus according to claim 1, wherein driving of the agitation member stops during a period from detection by the detection unit detecting a movement of the operation portion from the first position to the second position until detection by the detection unit detecting the movement of the operation portion from the second position to the first position.

3. The image forming apparatus according to claim 1, further comprising a toner remaining amount detection unit configured to detect an amount of toner stored in the storage portion, wherein the toner remaining amount detection unit detects the amount of toner after driving of the agitation member has been started based on detection by the detection unit detecting the movement of the operation portion from the second position to the first position, and while the agitation member is being driven.

4. The image forming apparatus according to claim 3, wherein the toner remaining amount detection unit starts detecting the amount of toner after a first predetermined time has elapsed from when the driving of the agitation member has been started based on detection by the detection unit detecting the movement of the operation portion from the second position to the first position.

5. The image forming apparatus according to claim 3, wherein the control unit controls the actuator in such a manner that driving of the agitation member is stopped after completion of detection of the amount of toner by the toner remaining amount detection unit.

6. The image forming apparatus according to claim 3, further comprising a display unit configured to display a remaining amount of toner in accordance with a result of detection of the amount of toner by the toner remaining amount detection unit, wherein the control unit controls the display unit in such a manner that display of a replenishment mode different from the display of the remaining amount of toner is started based on detection by the detection unit detecting the movement of the operation portion from the first position to the second position, and the control unit changes the display of the replenishment mode to the display of the remaining amount of toner after completion of detection of the amount of toner by the toner remaining amount detection unit.

7. The image forming apparatus according to claim 1, wherein the operation portion includes an annular portion and a protruding portion protruding outward in a radial direction of the annular portion from a center of the annular portion.

8. An image forming apparatus to which a toner container is attachable, the toner container storing toner and including an opening portion for toner replenishment and a shutter movable between a closed position where the opening portion is closed and an opened position where the opening portion is opened, the image forming apparatus comprising:

an attachment portion configured to receive attachment of the toner container;

a storage portion configured to store toner supplied from the opening portion of the toner container attached to the attachment portion;

an agitation member configured to agitate toner in the storage portion;

an actuator configured to drive the agitation member; and a control unit configured to control the actuator, wherein the attachment portion includes an operation portion, including an engagement portion configured to be engaged with the shutter in a state where the toner container is attached to the attachment portion, configured to move with the shutter by the engagement portion being engaged with the shutter, the operation portion being movable between a first position where the shutter is at the closed position and a second position where the shutter is at the opened position, and a detection unit configured to detect a movement of the operation portion, and wherein the control unit is exposed outside the image forming apparatus to be operable from outside the image forming apparatus in a state with the toner container being attached to the attachment portion, and wherein the control unit controls the actuator in such a manner that driving of the agitation member is started after a predetermined time has elapsed from when the detection unit has detected a movement of the operation portion from the first position to the second position.

9. An image forming apparatus to which a toner container is attachable, the toner container storing toner and including an opening portion for toner replenishment and a shutter movable between a closed position where the opening portion is closed and an opened position where the opening portion is opened, the image forming apparatus comprising:

an attachment portion configured to receive attachment of the toner container;

a storage portion configured to store toner supplied from the opening portion of the toner container attached to the attachment portion;

an agitation member configured to agitate toner in the storage portion;

an actuator configured to drive the agitation member; and a control unit configured to control the actuator, wherein the attachment portion includes an operation portion, including an engagement portion configured to be engaged with the shutter in a state where the toner container is attached to the attachment portion, configured to move with the shutter by the engagement portion being engaged with the shutter, the operation portion being movable between a first position where the shutter is at the closed position and a second position where the shutter is at the opened position, and a detection unit configured to detect a movement of the operation portion, and wherein driving of the agitation member is started before the detection unit detects a movement of the operation portion from the second position to the first position, and the control unit controls the actuator in such a manner that a driving speed of the agitation member increases based on detection by the detection unit detecting the movement of the operation portion from the second position to the first position.

10. An image forming system comprising:

a toner container configured to store toner and including a pouch storing toner, an end portion member which is disposed in an end portion of the pouch and has an opening portion for discharging toner in the pouch to outside of the toner container, and a container shutter which includes an engaged portion and is movable relative to the end portion member between a closed position where the opening portion is closed and an opened position where the opening portion is opened; and an image forming apparatus to which the toner container is attachable, wherein the image forming apparatus includes an attachment portion to which the toner container is attachable;

a storage portion configured to store the toner supplied from the opening portion of the toner container attached to the attachment portion;

an agitation member configured to agitate the toner in the storage portion;

an actuator configured to drive the agitation member; and a control unit configured to control the actuator, wherein the attachment portion includes an operation portion, including an engagement portion configured to be engaged with the engaged portion of the container shutter in a state where the toner container is attached to the attachment portion, configured to move with the container shutter by the engagement portion being engaged with the engaged portion of the container shutter, the operation portion being movable between a first position where the container shutter is at the closed position and a second position where the container shutter is at the opened position, and a detection unit configured to detect a movement of the operation portion, and wherein the control unit controls the actuator in such a manner that driving of the agitation member is started based on detection by the detection unit detecting a movement of the operation portion from the second position to the first position.

11. The image forming system according to claim 10, wherein the pouch is formed of a polypropylene sheet.

12. The image forming system according to claim 10, wherein in a case where the container shutter is rotated by the operation portion, the pouch does not rotate.

13. An image forming apparatus to which a toner container is attachable, the toner container storing toner and including an opening portion for toner replenishment and a shutter movable between a closed position where the opening portion is closed and an opened position where the opening portion is opened, the image forming apparatus comprising:

an attachment portion to which the toner container is attachable;

a storage portion configured to store toner supplied from the opening portion of the toner container attached to the attachment portion;

an agitation member configured to agitate toner in the storage portion;

an actuator configured to drive the agitation member; and a control unit configured to control the actuator, wherein the attachment portion includes an operation portion, including an engagement portion configured to be engaged with the shutter in a state where the toner container is attached to the attachment portion, configured to move with the shutter by the engagement portion being engaged with the shutter, the operation portion being movable between a first position where the shutter is at the closed position and a second position where the shutter is at the opened position, and a detection unit configured to detect whether the operation portion is at the first position, and wherein the control unit controls the actuator in such a manner that driving of the agitation member is started based on detection by the detection unit detecting transition from a state with the operation portion being not at the first position to a state with the operation portion being at the first position.

14. The image forming apparatus according to claim 13, further comprising a toner remaining amount detection unit configured to detect an amount of toner stored in the storage portion, wherein the toner remaining amount detection unit detects the amount of toner after driving of the agitation member has been started based on detection by the detection unit detecting transition from a state with the operation portion being not at the first position to a state with the operation portion being at the first position, and while the agitation member is being driven.

15. The image forming apparatus according to claim 14, wherein the toner remaining amount detection unit starts detecting the amount of toner after a first predetermined time elapsed from when driving of the agitation member has been started based on detection by the detection unit detecting transition from a state with the operation portion being not at the first position to a state with the operation portion being at the first position.

16. The image forming apparatus according to claim 14, wherein the control unit controls the actuator in such a manner that driving of the agitation member is started after completion of detection of the amount of toner by the toner remaining amount detection unit.

17. The image forming apparatus according to claim 14, further comprising a display unit configured to display a remaining amount of toner in accordance with a result of detection of the amount of toner by the toner remaining amount detection unit, wherein the control unit controls the display unit in such a manner that display of a replenishment mode different from the display of the remaining amount of toner is started based on detection by the detection unit detecting transition from a state with the operation portion being not at the first position to a state with the operation portion being at the first position, and the control unit changes the display of the replenishment mode to the display of the remaining amount of toner after completion of detection of the amount of toner by the toner remaining amount detection unit.

* * * * *